US011126792B2

(12) United States Patent
Hance et al.

(10) Patent No.: US 11,126,792 B2
(45) Date of Patent: Sep. 21, 2021

(54) VERSION HISTORY FOR OFFLINE EDITS

(71) Applicant: Dropbox, Inc., San Francisco, CA (US)

(72) Inventors: Travis Hance, San Francisco, CA (US); Matthew Broussard, San Francisco, CA (US); Igor Kofman, San Francisco, CA (US); Jake Scott, San Francisco, CA (US); Kevin Tunc, San Francisco, CA (US); Yi Bian, San Mateo, CA (US)

(73) Assignee: Dropbox, Inc., San Francisco, CA (US)

( * ) Notice: Subject to any disclaimer, the term of this patent is extended or adjusted under 35 U.S.C. 154(b) by 75 days.

(21) Appl. No.: 16/160,233

(22) Filed: Oct. 15, 2018

(65) Prior Publication Data

US 2020/0117705 A1    Apr. 16, 2020

(51) Int. Cl.
*G06F 40/197*   (2020.01)
*G06F 3/0482*   (2013.01)
*G06F 16/93*    (2019.01)
*G06F 40/106*   (2020.01)

(52) U.S. Cl.
CPC .......... *G06F 40/197* (2020.01); *G06F 3/0482* (2013.01); *G06F 16/93* (2019.01); *G06F 40/106* (2020.01)

(58) Field of Classification Search
CPC ....... G06F 16/93; G06F 40/106; G06F 3/0482
See application file for complete search history.

(56) References Cited

U.S. PATENT DOCUMENTS

| | | | | |
|---|---|---|---|---|
| 7,877,356 | B1* | 1/2011 | Guiheneuf | G06Q 10/00 707/622 |
| 2005/0246649 | A1* | 11/2005 | Wilhelm | G06F 16/41 715/762 |
| 2014/0006921 | A1* | 1/2014 | Gopinath | G06F 40/169 715/230 |
| 2014/0136487 | A1* | 5/2014 | Oyarzabal | G06F 16/2365 707/684 |
| 2015/0012488 | A1* | 1/2015 | van Rossum | G06F 11/00 707/611 |
| 2015/0106685 | A1* | 4/2015 | Gupta | G06F 40/154 715/234 |
| 2015/0199411 | A1* | 7/2015 | Greenspan | G06F 16/2474 715/229 |
| 2017/0286711 | A1* | 10/2017 | Negrea | G06F 21/6218 |
| 2018/0113862 | A1* | 4/2018 | Glover | G06F 16/93 |

* cited by examiner

*Primary Examiner* — Kyle R Stork
(74) *Attorney, Agent, or Firm* — DLA Piper LLP (US)

(57) ABSTRACT

A collaborative content management system receives, from a client device having access to an account associated with the collaborative content management system, a request for versions of a collaborative document managed by the collaborative content management system. The collaborative content management system accesses a set of versions of the collaborative document. The set of versions includes at least one offline version. The at least one offline version was created on a client device having access to the collaborative document while the client device was disconnected from the collaborative content management system and synchronized to the collaborative content management system when the client device is connected to the collaborative content management system. The collaborative content management system generates a user interface providing the set of versions.

22 Claims, 16 Drawing Sheets

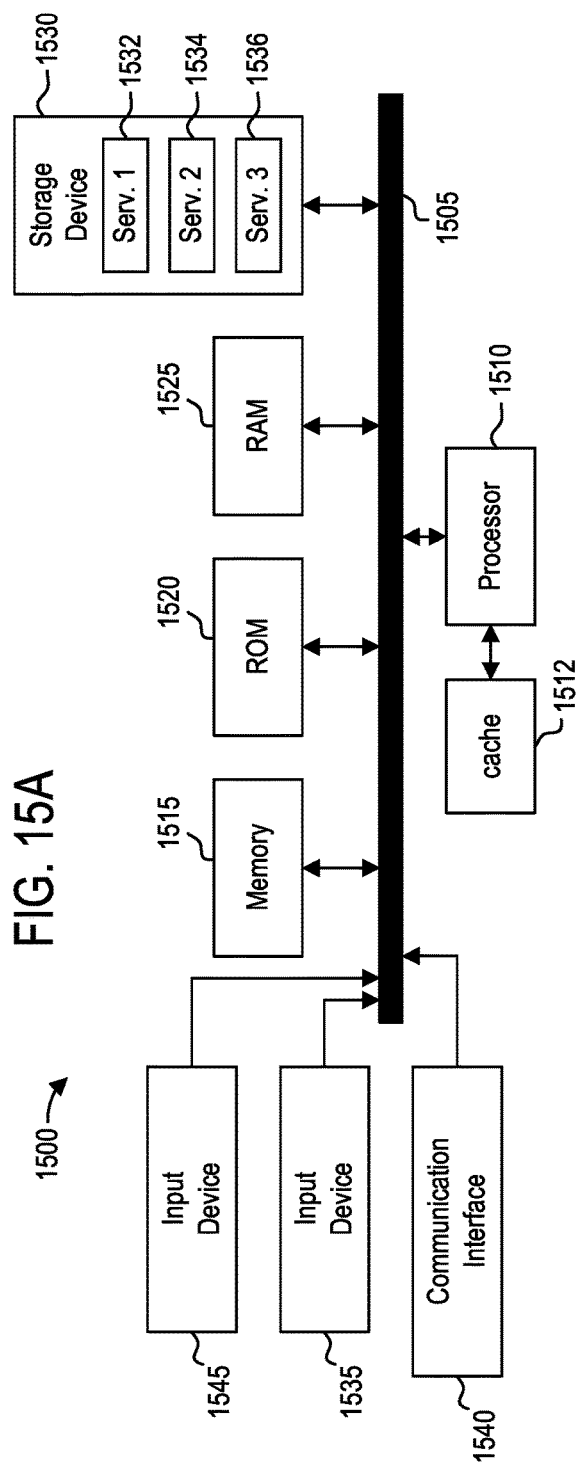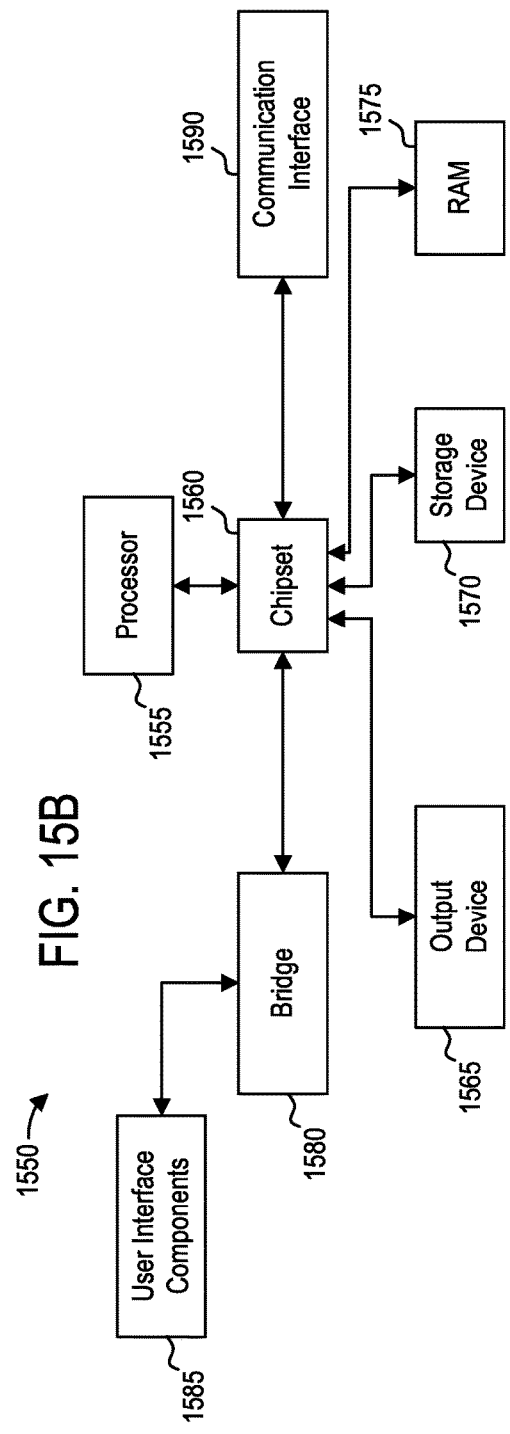

VERSION HISTORY FOR OFFLINE EDITS

TECHNICAL FIELD

The present technology pertains to the creation or editing of content items; and more specifically pertains to generating an improved user interface displaying a version history of a content item, and including in the version history one or more modifications performed offline.

BACKGROUND

Currently, there is no perfect user interface that visually illustrates modifications to a content item over the life of that content item. For example, conventional solutions to illustrating modifications to a content item may include a single document visually illustrating all modifications made to the content item over the life of the content item. In another example, conventional solutions to illustrating modifications to a content item may include manual opening of different files associated with the content item, with each file corresponding to a separate version of the content item. Further, there is currently no solution to unifying versions of a collaborative content item that were made offline with versions of a collaborative content item that were made online. Accordingly, offline modifications may be lost due to subsequent modifications thereto.

SUMMARY

In some embodiments, a computer-implemented method is disclosed herein. A collaborative content management system receives, from a client device having access to an account associated with the collaborative content management system, a request for versions of a collaborative document managed by the collaborative content management system. The collaborative content management system accesses a set of versions of the collaborative document. The set of versions includes at least one offline version. The at least one offline version was created on a client device having access to the collaborative document while the client device was disconnected from the collaborative content management system and synchronized to the collaborative content management system when the client device is connected to the collaborative content management system. The collaborative content management system generates a user interface providing the set of versions.

In some embodiments, a non-transitory computer readable medium is disclosed herein. The non-transitory computer readable medium includes one or more sequences of instructions which, when executed by one or more processors, cause the one or more processors to perform operations. The operations include receiving, from a client device having access to an account associated with the collaborative content management system, a request for versions of a collaborative document managed by a collaborative content management system. The operations further include accessing a set of versions of the collaborative document. The set of versions includes at least one offline version. The at least one offline version was created on a client device having access to the collaborative document while the client device was disconnected from the collaborative content management system and synchronized to the collaborative content management system when the client device is connected to the collaborative content management system. The operations further include generating a user interface providing the set of versions.

In some embodiments, a computer-implemented method is disclosed herein. A computing device receives, via a user interface displayed thereon, input requesting a version history associated with a collaborative document. The computing device transmits, to a collaborative content management system, the request for versions of a collaborative document managed by the collaborative content management system. The computing device receives, from the collaborative content management system, a set of versions of the collaborative document. The set of versions includes at least one offline version. The at least one offline version was created on the computing device while the computing device was disconnected from the collaborative content management system. The computing device displays, by a display associated with the computing device, the set of versions of the collaborative document.

BRIEF DESCRIPTION OF THE DRAWINGS

The above-recited and other advantages and features of the disclosure will become apparent by reference to specific embodiments thereof, which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings.

FIG. 15A illustrates an example system configuration for implementing various embodiments of the present technology, according to example embodiments.

FIG. 15B illustrates an example system configuration for implementing various embodiments of the present technology, according to example embodiments.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The one or more techniques disclosed herein addresses the need in the art for providing one or more new capabilities of a user interface for displaying a version history associated with a collaboration document. For example, the one or more techniques described herein provide an improved user interface that includes a version history of a collaboration document that includes one or more modification events associated with the collaboration document. Each modification event may include one or more sets of revisions by one or more authors.

Further, included in the version history of the collaboration document may be one or more versions of the collaboration document that were made while a computing system was in communication with the system, as well as one or more versions of the collaboration document that were made while the computing system was not in communication with the system. As such, the version history may provide to the user an accurate overview of the history of the collaboration document by taking into account both online revisions and offline revisions of the collaboration document.

Still further, the one or more techniques disclosed herein provide various advantages over conventional user interfaces. In particular, the version history generated herein provides a linear view of one or more versions associated with a collaboration document, such that a user may view all versions associated therewith, without having to change screens or navigate to a document management system. Such linear view is absent from conventional user interfaces. Additionally, the user interface generated herein includes one or more offline versions of the collaboration document that was generated by a requesting user. Accordingly, the user is provided not only with an outlook of those versions of the collaboration document that were synchronized with the central server, but also those versions that were created by the user in scenarios when the user's computing device may become disconnected from the central server. Accordingly, the user no longer has to navigate to a local storage location to view changes or modifications that were not synchronized with the central server.

Figure 1:
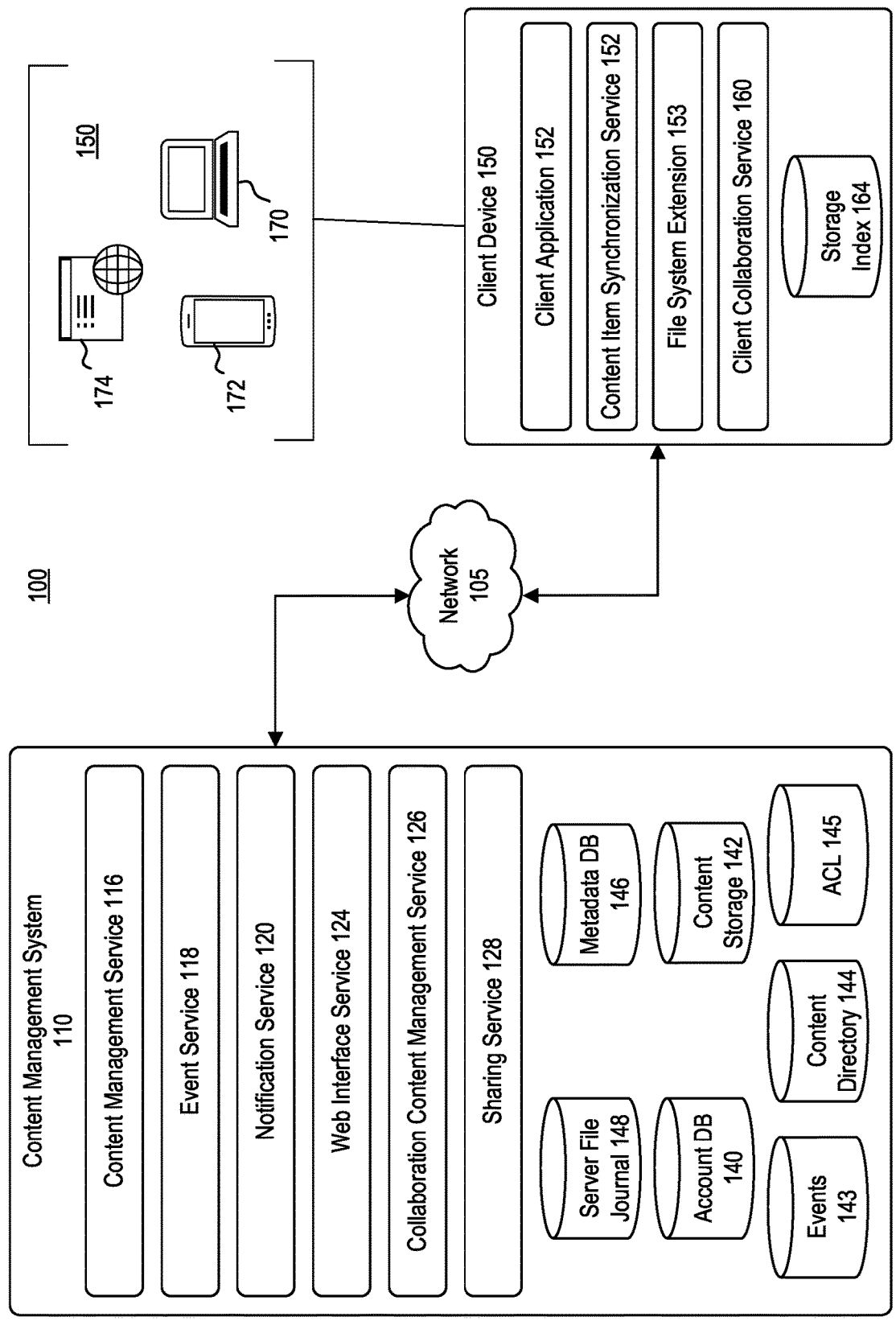
FIG. 1 illustrates an example system configuration of a content management system and client devices, according to example embodiments.

FIG. 1 is a block diagram illustrating a system configuration 100, according to example embodiments. System configuration 100 may include a content management system 110 interacting with a client device 150.

Content management system 110 may include one or more components. For example, as illustrated, content management system 110 may include content management service 116, event service 118, notification service 120, web interface service 124, collaboration content management service 126, and sharing service 128. In some embodiments, content management system 110 may further include one or more storage items. Such storage items may include, but are not limited to, server file journal 148, account database 140, events 143, content directory 144, access control list (ACL) 145, content storage 142, and metadata database 146.

Content management system 110 may communicate with client device 150 via network 105. Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in system configuration 100 to send and receiving information between the components of system configuration 100.

Client device 150 may include one or more components. For example, as illustrated, client device 150 may include client application 152, content item synchronization service 152, file system extension 153, and client collaboration service 160. In some embodiments, client device 150 may further include one or more storage components. As illustrated, client device 150 may include storage index 164.

Accounts

Content management system 110 can store content items in association with accounts, as well as perform a variety of content item management tasks, such as retrieve, modify, browse, and/or share the content item(s) (e.g., collaboration documents). Furthermore, content management system 110 can enable an account to access collaboration document(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of collaboration documents while an engineering group can have access to another set of collaboration documents. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 can be a computing device having a local file system accessible by multiple applications resident thereon. Client device 172 can be a computing device wherein content items are only accessible to a specific application or by permission given by the specific application, and the content items are stored either in an application specific space or in the cloud. Client device 174 can be any client device accessing content management system 110 via a web browser and accessing content items via a web interface. While example client devices 170, 172, and 174 are depicted in form fusers such as a laptop, mobile device, or web browser, it should be understood that the descriptions thereof are not limited to devices of these example form fusers. For example a mobile device such as client 172 might have a local file system accessible by multiple applications resident thereon, or client 172 might access content management system 110 via a web browser. As such, the form fuser should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110.

Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user whom which a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 117 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and Collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2A:
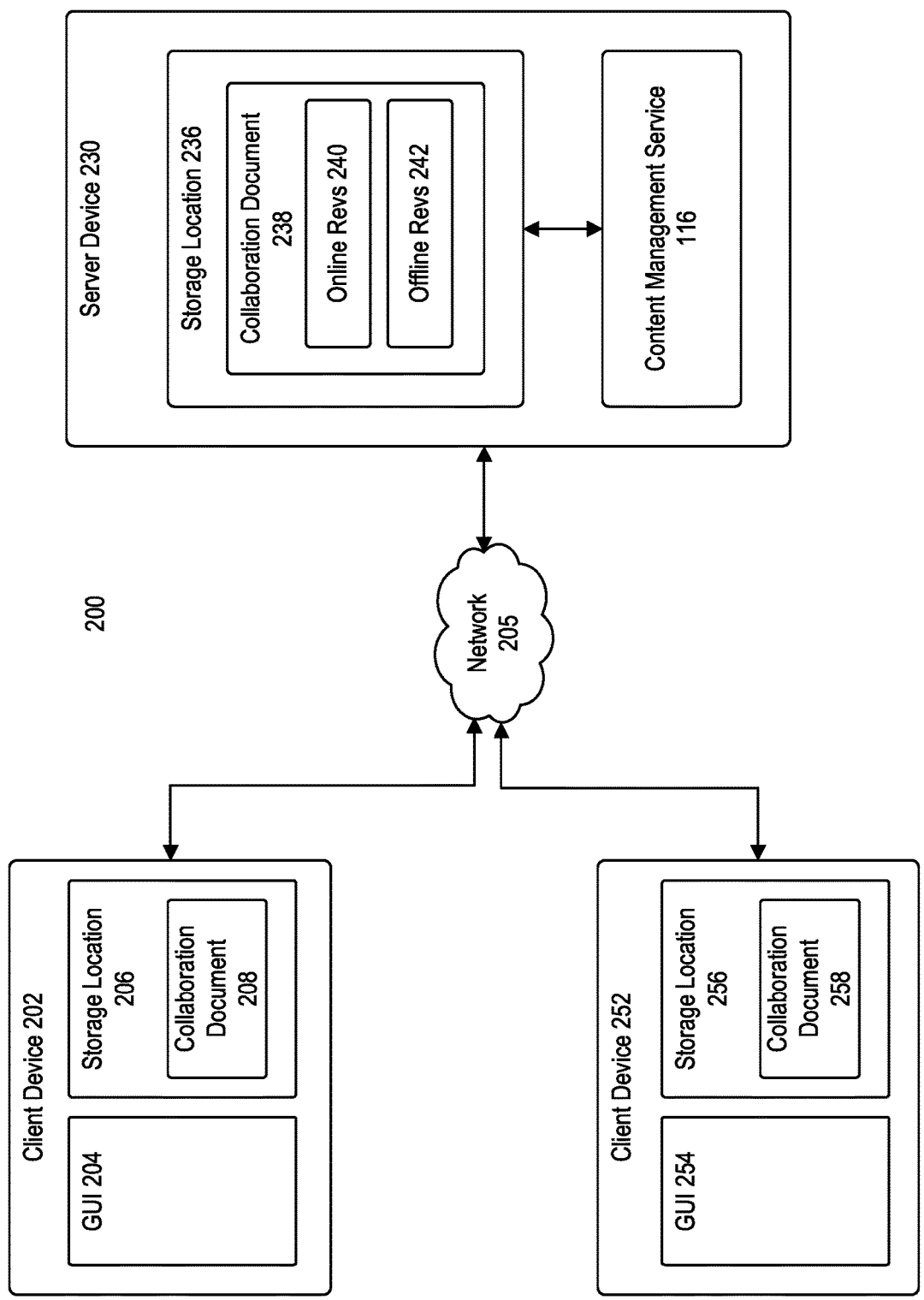
FIG. 2A illustrates an example system configuration of the content management system and client devices of FIG. 1, according to example embodiments.

FIG. 2A is a block diagram of an example system 200, according to example embodiments. For example, system 200 may correspond to system 100 described above. As illustrated, system 200 may include client device 202, client device 252, and service device 230 communicating via network 205 (similar to network 105). A user of client device 202 (e.g., client device 150) may create an account with content management system 110. Client device 202 may include a collaboration graphical user interface (GUI) 204 and an storage location 206. User of client device 202 may view a collaboration document 238 stored on server device 230, via collaboration GUI 204. Via collaboration GUI 204, user of client device 202 may view, edit, modify, etc. collaboration document 238. In some embodiments, client device 202 may become disconnected from server device 230. For example, client device 202 may be offline. Collaboration document 208 may include all revisions made thereto up until the time at which client device 202 was disconnected from server device 230. The user may continue working on collaboration document 208. All subsequent changes or revisions made to collaboration document 208 may be stored locally in local storage 206. The user may apply those changes or revisions to collaboration document 208 once the user reconnects client device 202 with server device 230.

As illustrated, collaboration document 208 on client device 202, collaboration document 238 on server device 230, and collaboration document 258 on client device 252 are all reflective of the same collaboration document. In those embodiments when both client device 202 and client device 252 are connected with server device 230, the content across each collaboration document (e.g., collaboration document 208, collaboration document 238, and collaboration document 258) are the same. In those embodiments in which either client device 202 or client device 252 become disconnected from server device 230, the collaboration documents remain the same; however, each collaboration document may not include all of the same revisions (e.g., collaboration document 208 may not include all current revisions associated with collaboration document 238, if client device 202 becomes disconnected from server device 208).

User of client device 202 may share access to collaboration document 238 with a user of client device 252. Client device 252 may be configured similar to client device 202. Client device 252 may include collaboration GUI 254 and an storage location 256. User of client device 252 may view collaboration document 238 stored on server device 230, via collaboration GUI 254. Via collaboration GUI 254, user of client device 252 may view, edit, modify, etc. collaboration document 238. In some embodiments, user of client device 252 may designate a collaboration document (e.g., collaboration document 238) for offline editing. As such, storage location 256 may be created on client device 202, such that user can access collaboration document 258 (corresponding to collaboration document 238) while client device 252 is not connected to server device 230.

Content management service 116 may manage one or more edits or modifications to collaboration document 238. Content management service 116 may facilitate storage of one or more revisions ("revs") 240 associated with collaborative document 238. A revision 240 may correspond to an edit made to collaborative document 238. For example, a revision 240 may correspond to changes made to version 1 of collaborative document 238 and version 2 of collaborative document 238. Such revision may include one or more differences between version 1 and version 2 of collaborative document 238. Accordingly, when a user requests to view a current version of collaborative document 238 via, for example, collaboration GUI 204, content management service 116 may generate collaborative document 238 based on a combination of the one or more revisions 240.

In some embodiments, content management service 116 may track metadata associated with each edit or modification to collaboration document 238. For example, content management system 116 may identify one or more authors associated with each revision 240, as well as a date and time associated therewith. Accordingly, when stored in storage location 236, each revision 240 may include one or more authors and a date and time of creation.

Figure 2B:
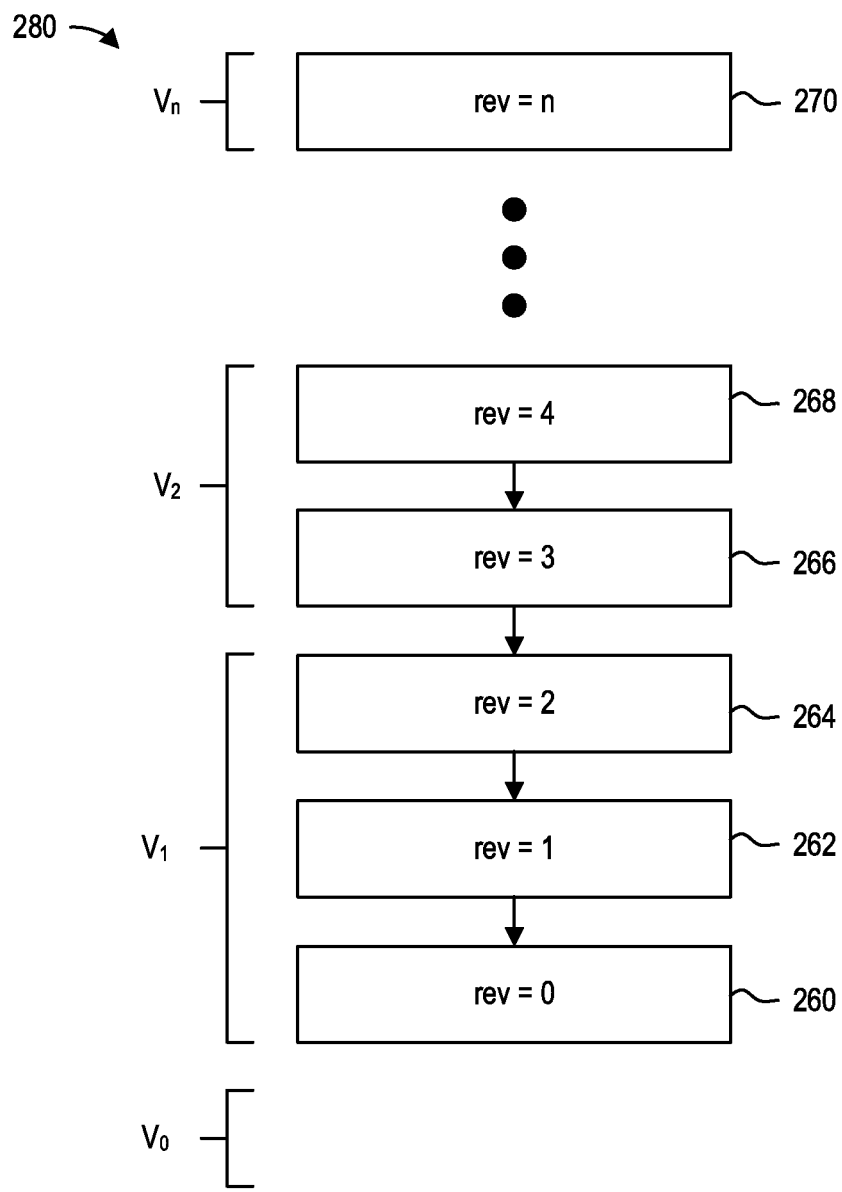
FIG. 2B is a block diagram illustrating revisions associated with a collaboration document, according to example embodiments.

FIG. 2B is a block diagram illustrating a version history 280 of a collaboration document, according to example embodiments. As users collaboratively modify a document (e.g., collaboration document 208), the one or more incremental changes to the document may be stored as one or more revisions (e.g., additions to the document, deletions in the document, modifications to the document, etc.). An incremental change can be stored as a revision at any suitable level of granularity. For example, a revision can be the addition or deletion of a letter, a word, a sentence, a paragraph, a graphic, an image, and the like. Content management service 116 may group one or more revisions into a document version based on one or more factors. For example, content management service 116 may create a version that includes one or more revisions that occur in a specific time frame (e.g., a new version is created every two minutes). When a user requests a collaboration document (e.g., collaboration document 208), in operation, content management service 116 may access the original document (e.g., version 0), and the one or more versions over the course of the life of the collaboration document may be applied, chronologically, to the collaboration document. The end result is an up-to-date collaboration document that reflects all revisions made thereto.

As illustrated, block diagram 280 may be representative of a collaboration document (e.g., collaboration document 238). Collaboration document 238 may be composed of one or more blocks 260-270. Each block 260-270 may be representative of one or more revisions (e.g., edits or modifications) made to collaboration document 238 by one or more users having access thereto.

As stated above, content management service 116 may group one or more revisions into a version of collaboration document 238. Block diagram 280 may include one or more document versions $V_0$-$V_n$. Each version may include one or more revisions. Revisions may be grouped into a version based on any suitable criteria. For example, a version may be created based on intelligence that determines a set of revisions should belong to the same version (e.g., a set of revisions that belong to the same user or set of users, a set of revisions that are related to edits of a particular portion of a document, a set of revisions occurring within a specific time frame, etc.). In some embodiments, one or more revisions may be temporally grouped. For example, in minutes 0-2, three revisions, represented by blocks 260-264, may occur. Block 260 may correspond to an addition of a sentence to the original document ($V_0$); block 262 may correspond to the deletion of a word from the original document ($V_0$); and block 264 may correspond to the addition of an image to the original document ($V_0$). The three revisions may define Version 1 ($V_1$) of the collaboration document.

Continuing with the example, Version 2 ($V_2$) may include two revisions, represented by blocks 266 and 268. Each revision may be made to Version 1 ($V_2$) of the collaboration document. Generally, Version N ($V_N$) may include one or more revisions, represented by block 270.

To build a current state of the collaboration document, content management service 116 may access and/or render the original document ($V_0$). Content management service 116 may sequentially apply the one or more versions of the collaboration document to the original document ($V_0$). Accordingly, content management service 116 may first apply Version 1 to the original document, then Version 2, all the way up to Version N of the collaboration document.

If, for example, a user requested to roll back to a non-current version of the collaboration document (i.e., a version preceding Version N), content management service 116 may easily render the document by only applying those versions of the document to the original document up to the particular version requested by the user.

Those skilled in the art may immediately recognize that storing edits and/or modifications to collaboration document 238 as one or more revisions has several advantages over conventional content management systems. For example, when a user requests a specific version of collaboration document 238, rather than search for a specific file, content management service 116 may identify those revisions to collaboration document 238 that define the specific version of collaboration document 238 and apply those revisions chronologically to the original version of collaboration document 238. In other words, when a user requests a collaboration document (e.g., collaboration document 238), the collaboration document presented to the user is a compilation of one or more revisions to collaboration document 238 at a particular point of time.

Further, rather than store a copy of each version of collaboration document 238 as a separate file in storage location 236, content management service 116 may only store the original version of collaboration document 238 and one or more revisions made thereto. Such functionality may increase the efficiency of server device 230 by reducing the storage footprint of a given collaboration document.

Referring back to FIG. 2A, storage location 236 of server device 230 may further store one or more offline revisions 242. As illustrated, one or more offline revisions 242 may be stored in parallel with one or more online revisions 240 to collaboration document 238. One or more offline revisions 242 may be generated by client device 202 (or client device 252) when client device 202 is offline (i.e., not connected to server device 230). Accordingly, when client device 202 is offline, client device 202 may store edits made to collaboration document 238 to storage location 206 as collaboration document 208. In some embodiments, rather than storing the one or more edits made to collaboration document 238 as a revision to storage location 206, client application 152 may store edits made to collaboration document 238 as a new collaboration document 208. In some embodiments, client application 152 may store edits made to collaboration document 238 as one or more revisions. When client device 202 regains connectivity and is back online with server device 230, content item synchronization service 152 on client device 202 may synchronize collaboration document 208 with server device 230. Accordingly, an entry for collaboration document 208 may be stored in parallel to collaboration document 238, as an offline revision 242.

In some implementations, collaboration GUI 204 (or collaboration GUI 254) may view and interact with storage location 236 through content management service 116. For example, a user may provide input to collaboration GUI 204 to cause collaboration GUI 204 to request from content management service 116 a version history of a collaboration document. Content management service 116 may deliver the version history to collaboration GUI 204 so that collaboration GUI 204 may display the version history on a display associated with client device 202. In some embodiments, as part of the version history, content management service 116 may deliver to collaboration GUI 204 one or more indications of one or more offline revisions so that collaboration GUI 204 may display the one or more offline revisions as part of the version history on display device of client device 202.

In some embodiments, a user may provide input to collaboration GUI 204 to cause collaboration GUI 204 to request from content management service 116 one or more revisions associated with a particular version of the collaboration document in the version history. Content management service 116 may deliver the one or more revisions associated with the requested version.

Further, in some embodiments, a user may provide input to collaboration GUI 204 to cause collaboration GUI 204 to request content management service 116 to revert the current version of the collaboration document to a particular version of the collaboration document in version history. Content management service 116 may then perform the reversion, and deliver an updated version history to collaboration GUI 204 so that collaboration GUI 204 may display the updated version history on a display associated with client device 202.

Still further, in some embodiments, a user may provide input to collaboration GUI 204 to cause collaboration GUI 204 to request from content management service 116 an offline version of the collaboration document. Content management service 116 may deliver a preview of the offline version to collaboration GUI 204 so that collaboration GUI 204 may display the preview of the offline version of the collaboration document on the display associated with client device 202.

Figure 3:
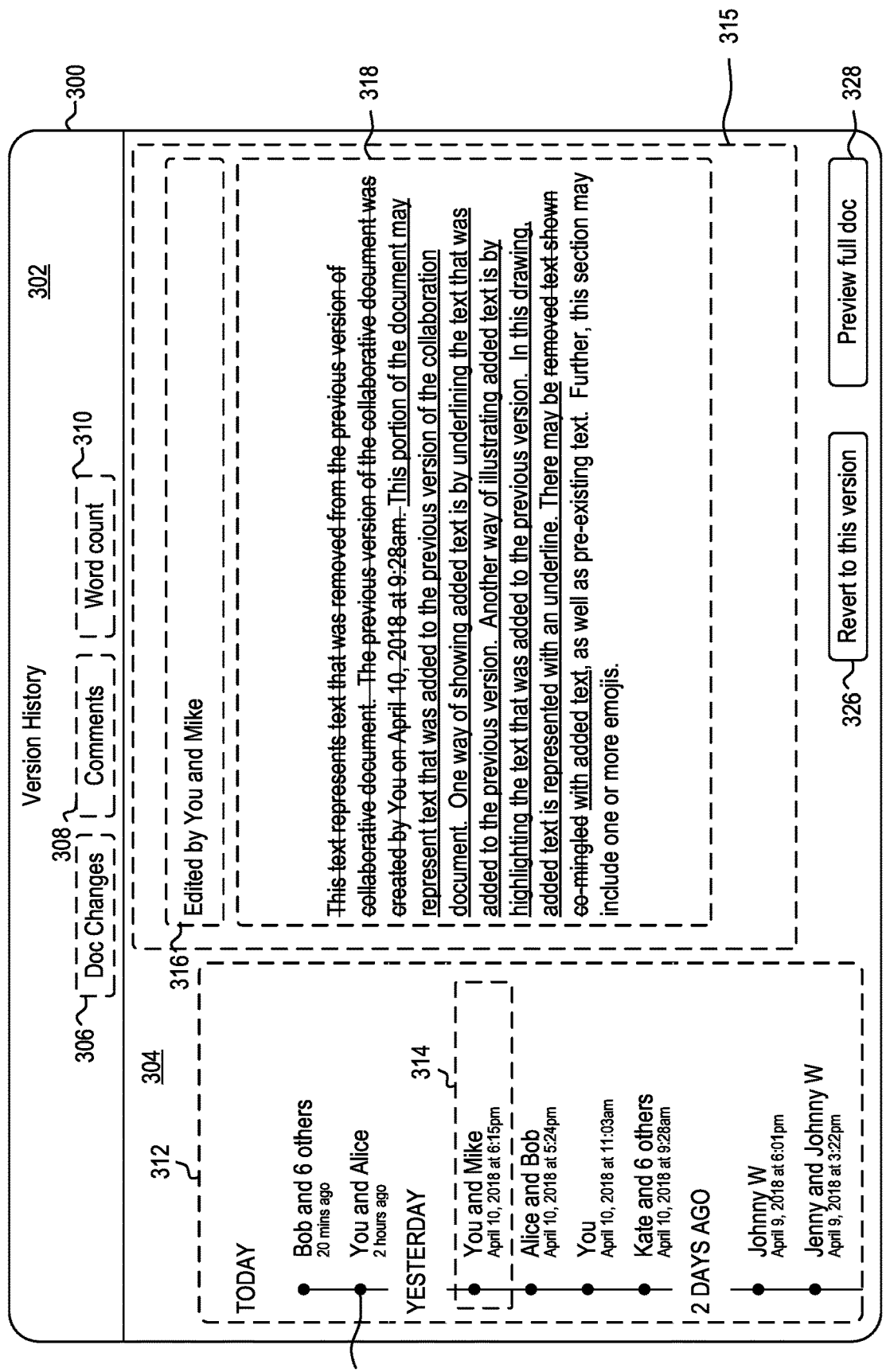
FIG. 3 illustrates an example view of a graphical user interface presenting a version history, according to example embodiments.

FIG. 3 illustrates an example view of a graphical user interface 300 presenting a version history, according to example embodiments. Graphical user interface 300 (hereinafter "GUI 300") may correspond to collaboration GUI 204 and/or collaboration GUI 254 of FIG. 2A. In some embodiments, GUI 300 may be a web page presented in a web browser application of client device 150. In some embodiments, GUI 300 may be a graphical user interface generated by a native software application executing on client device 150.

As illustrated, GUI 300 may correspond to a graphical user interface generated as a result of a user requesting a version history associated with a content item (e.g., collaboration item 238). GUI 300 may include a first portion 302 and a second portion 304. First portion 302 of GUI 300 may correspond to a "header" portion of GUI 300. First portion 302 may include one or more graphical elements 306, 308, 310 (e.g., button, link, etc.) selectable by user to cause GUI 300 (e.g., the browser or native application) to send a message to content management service requesting information associated with each graphical element 306-310.

Graphical element 306 may correspond to document changes. Accordingly, upon receiving input via graphical element 306, GUI 300 may request from content management service 116 one or more document changes (e.g., edits, modifications, etc.) to the selected collaboration document. Content management service 116 may deliver the one or more document changes to GUI 300 so that GUI may display the one or more document changes on the display associated with client device 150.

Graphical element 308 may correspond to a comment history associated with the collaboration document. Accordingly, upon receiving input via graphical element 308, GUI 300 may request from content management service 135 one or more comments associated with selected collaboration document. Content management service 116 may deliver one or more comments to GUI 300 so that GUI 300 may display the one or more comments on display associated with client device 150.

Graphical element 310 may correspond to a word count associated with the collaboration document. Accordingly, upon receiving input via graphical element 310, GUI 300 may request from content management service 135 a word count associated with selected collaboration document. Selection of graphical element 310 may not only display the word count associated with the collaboration document, but, in some embodiments, may also display the number of characters in the collaboration document and the number of emojis used in the collaboration document. Content management service 116 may deliver the word count to GUI 300 so that GUI 300 may display the word count on display associated with client device 150.

Second portion 304 of GUI 300 may include a version history 312 associated with the collaboration document when graphical element 306 is selected. Version history 312 may include one or more modification events 314 associated with the collaboration document. Each modification event 314 may include one or more edits or revisions to the collaboration document. As illustrated, each modification event 314 may include metadata associated therewith. Such metadata may include at least one or more users that modified the collaboration document during each modification event 314 as well as a date and time associated with modification event 314. For example, as illustrated, modification event 314 may recite "You and Mike" corresponding to the one or more users that modified the collaboration document, and "Apr. 10, 2018 at 6:15 pm" corresponding to the date and time in which modification event 314 was created.

As illustrated, version history 312 may provide a snapshot of the one or more revisions associated with the collaboration document. Version history 312 may be provided in chronological order, such that a user can easily identify the order in which one or more versions of collaboration document was created. In some embodiments, each modification event 314 may include graphical element 311 corresponding a respective modification event 314.

Upon receiving input of a selection of modification event 314 via, for example, graphical element 311, GUI 300 may request from content management service 116 one or more revisions associated with modification event 314. Content management service 116 may deliver the one or more revisions to GUI 300 so that GUI 300 may display the one or more revisions associated with modification event 314 on the display associated with client device 150.

Second portion 304 of GUI 300 may further include a collaboration document area 315 when graphical element 306 is selected. Collaboration document area 315 may include a representation of the revisions corresponding to a user's selection of a particular modification event and metadata associated with the modification event. Collaboration document area 315 may include graphical element 316 and graphical element 318.

Graphical element 316 may include metadata associated with the selected modification event. For example, using modification event 314, graphical element 316 may include the one or more users that modified the collaboration document during modification event 314. As illustrated, graphical element 316 recites "Edited by You and Mike." Although not illustrated, graphical element 316 may further include a date and/or time modification event 314 was created.

Graphical element 318 may include the one or more revisions associated with modification event 314. For example, graphical element 318 may include text that was added or removed from a previous version (e.g., the version corresponding to Alice and Bob, Apr. 10, 2018 at 5:24 pm) of the collaboration document during modification event 314. In some embodiments, GUI 300 may illustrate removed text by striking through that text, which was removed. In some embodiments, GUI 300 may illustrate removed text by highlighting that text which was removed, using a certain color highlight (e.g., red). In some embodiments, GUI 300 may illustrate the removed text by displaying the removed text in a certain color (e.g., orange). In some embodiments, GUI 300 may illustrate added text by underling that text which was added. In some embodiments, GUI 300 may illustrate added text by highlighting that text which was added using a certain color highlight (e.g., green). In some embodiments, GUI 300 may illustrate added text by displaying the added text in a certain color (e.g., blue). Additionally, although not shown, when a user hovers over a portion of the revisions, GUI 300 may update and illustrate an user associated with a particular revision.

Second portion 304 of GUI 300 may further include one or more graphical elements 326 and 328, (e.g., button, link, etc.) selectable by user. In some embodiments, graphical element 326 and graphical element 328 may be actionable upon a selection of a modification event (e.g., modification event 314). In other words, graphical element 326 and graphical element 328 may be inactive when a modification event is not selected. In operation, when selected by user, GUI 300 (e.g., the browser or native application) may send a message to content management service requesting an action associated with each graphical element 326 and 328.

Graphical element 326 may correspond to an instruction to revert the collaboration document to a version of the collaboration document represented by the selected modification event. Accordingly, upon receiving input via graphical element 326, GUI 300 may request that content management service 116 reverts the collaboration document from a current version to a version represented by the selected modification event (e.g., modification event 314)-. Content management service 116 may, in turn, generate a new revision to the collaboration document that replaces the current version of the collaboration document with the version of the collaboration document represented by the selected modification event.

Graphical element 328 may correspond to previewing the full version of the document corresponding to the selected modification event. Accordingly, upon receiving input via graphical element 328, GUI 300 may request from content management service 116 a preview of the full version of the document corresponding to the selected modification event. Content management service 116 may deliver the preview of the full version of the document to GUI 300 so that GUI 300 may display the preview of the full version of the document on display associated with client device 150.

Figure 4:
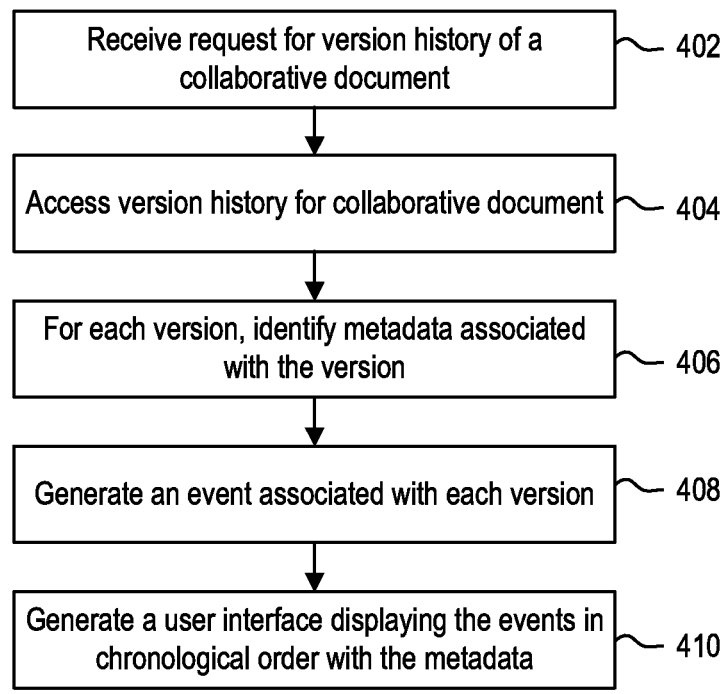
FIG. 4 illustrates a method of generating a graphical user interface presenting a version history, according to example embodiments.

FIG. 4 illustrates a method 400 of generating a graphical user interface presenting a version history, according to example embodiments. At step 402, content management system 110 may receive a request for a version history of a collaborative document. For example, a user may provide input to GUI 300 to cause GUI 300 to request from content management service 116 a version history of a collaboration document.

At step 404, content management system 110 may access a version history associated with a collaboration document. For example, content management service 116 may access storage location 236 storing collaboration item 238. Stored with collaboration item 238 may be one or more revisions associated with the collaboration document. Each revision may correspond to an editing or modification of the collaboration document by an user that has read/write privileges to the collaboration document.

At step 406, for each revision, content management system 110 may identify metadata associated therewith. For example, content management service 116 may cross reference each revision with metadata associated therewith to determine an user associated with each revision. In some embodiments, content management service 116 may cross reference each revision with metadata associated therewith to determine a date and time associated with each revision. Accordingly, content management service 116 may map one or more identified users and a date and time to each revision.

At step 408, content management system 110 may generate a modification event associated with one or more revisions. The modification event may be representative of a version of the collaboration document. Content management service 116 may group one or more revisions to define a modification event. In some embodiments, the modification event may include one or more revisions contemporaneous (or near-contemporaneous) in time. For example, content management service 116 may group a first revision made by Bob at 1:00 pm and a second revision made by Alice at 1:02 pm into a single modification event. Accordingly, each modification event may include more than one revision performed by more than one user at disparate times.

At step 410, content management system 110 may generate the version history and transmit the version history to client device 150 for rendering. For example, upon receiving the version history from content management service 152, client device 150 may render GUI 300 that displays version history 312.

Figure 5:
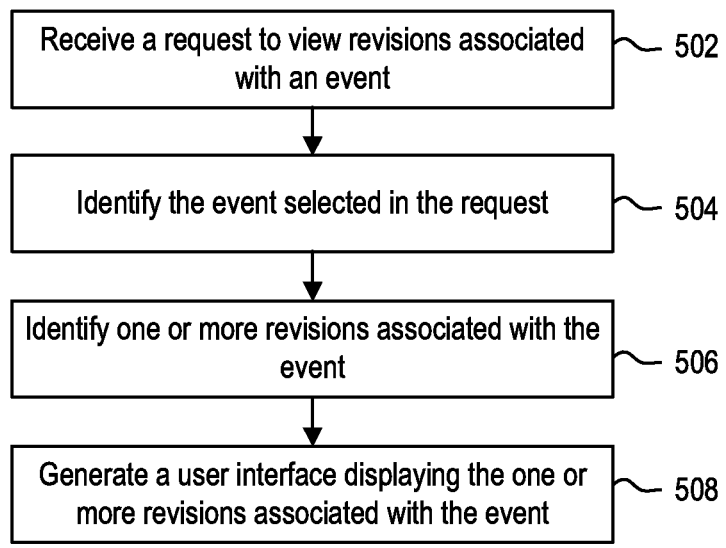
FIG. 5 illustrates a method of generating a graphical user interface presenting a version history, according to example embodiments.

FIG. 5 illustrates a method 500 of generating a graphical user interface presenting a version history, according to example embodiments. At step 502, content management system 110 may receive a request to view one or more revisions associated with a modification event. For example, a user may provide input to GUI 300 to cause GUI 300 to request from content management service 116 one or more revisions associated with a modification event. Such input may be, for example, a user selecting graphical element 311 associated with a particular modification event 314.

At step 504, content management system 110 may identify the modification event associated with the request. For example, content management service 116 may identify one or more parameters associated with the request received from GUI 300.

At step 506, content management system 110 may access one or more revisions associated with the selected modification event. For example, content management service 116 may identify one or more revisions that were grouped in the selected modification event.

At step 508, content management system 110 may update GUI 300 and transmit information to client device 150, so that client device 150 can render updated GUI 300 to display the one or more revisions associated with the selected modification event. In some embodiments, content management system 116 may transmit one or more instructions to client device 150 regarding how to render one or more portions of the revisions. For example, content management service 116 may instruction client device 150 that a first portion of the one or more revisions are to be underlined (e.g., signaling modifications that were added), and that a second portion of the one or more revisions are to be struck-through (e.g., signaling modifications that were removed).

Figure 6:
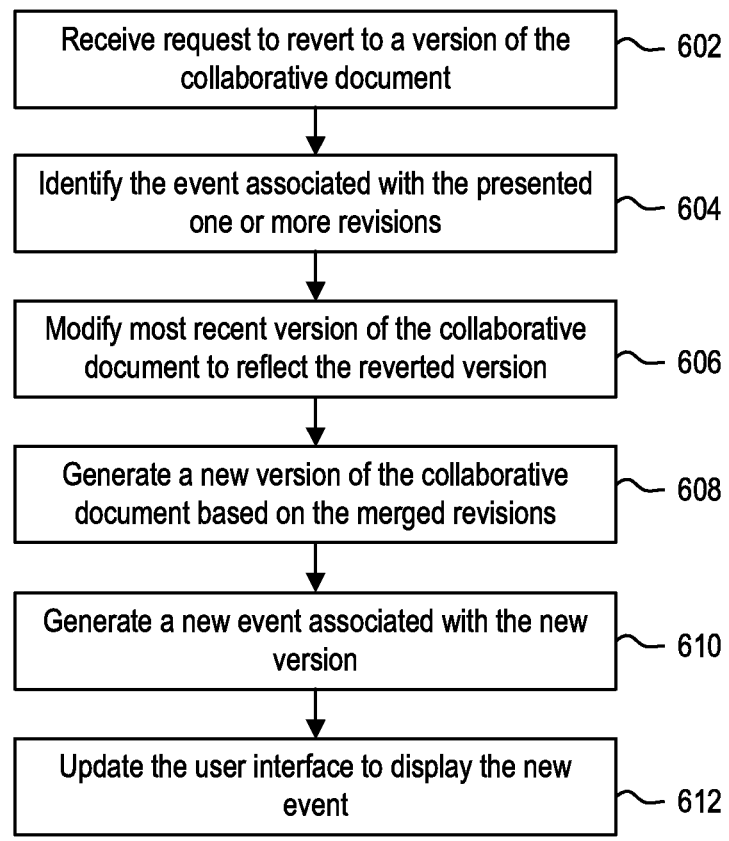
FIG. 6 illustrates a method of generating a graphical user interface presenting an updated version history following a reversion, according to example embodiments.

FIG. 6 illustrates a method 600 of generating a graphical user interface presenting an updated version history following a reversion, according to example embodiments. At step 602, content management system 110 may receive a request to revert to a version of the collaboration document. For example, a user may provide input to GUI 300 to cause GUI 300 to request that content management service 116 revert to a selected version of the collaboration document. Such input may be, for example, a user selecting graphical element 326 on GUI 300.

At step 604, content management system 110 may identify the modification event corresponding to the reversion request. For example, content management service 116 may identify one or more parameters associated with the request received from GUI 300. Such parameters may include, for example, an identifier corresponding to the displayed modification event.

At step 606, content management system 110 may modify the most recent version of the collaboration document to reflect the state of the collaboration document associated with modification event associated with the reversion request. For example, content management service 116 may modify the most recent version of the collaboration document with content associated with the selected version of the collaboration document. In other words, content management service 116 may modify the most recent version of the collaboration document to only include content that is visible in the selected version of the collaboration document. In some embodiments, the content that is visible in the selected version of the collaboration document includes content that was added to the collaboration document (i.e., information that was added to the previous version during the modification event). In some embodiments, the content that is visible in the selected version of the collaboration document includes content that was removed from the collaboration document (i.e., information that was removed from the previous version during the modification event).

At step 608, content management system 110 may generate a new version of the collaboration document based on the one or more revisions associated with the selected modification event. For example, content management service 116 may create and store a new version of the collaboration document that reflects the reversion to the selected modification event. Content management service 116 may store the one or more revisions associated with the selected modification event as one or more mew revisions to the most recent version (now, second most recent) version of the collaboration document. Content management service 116 may store the one or more revisions in revisions 240 associated with collaboration item 238.

At step 610, content management system 110 may generate a new modification event associated with the new version of the collaboration document. In some embodiments, the new modification event may include the one or more revisions, as made to the second most recent version of the collaboration document. In some embodiments, the new modification event may include the one or more revisions, as made to the version of the collaboration document that preceded the modification event to which the collaboration document was reverted. In other words, rather than define the modification event as a modification to the second most recent version of the collaboration document, content management service 116 may define the new modification event as the reverted modification event.

At step 612, content management system 110 may generate GUI 300 and transmit information to client device 150, so that client device 150 can render updated GUI 300 to display the new modification event in the version history. In some embodiments, content management service 116 may deliver an updated version history that includes the new modification event to GUI 300 so that GUI may display the updated version history on a display associated with client device 150. In some embodiments, as part of the version history, content management service 116 may deliver to GUI 300 a graphical element (described below) that visually indicates to a user that the new modification event was a reversion to a previous modification event.

Further, in some embodiments, content management service 116 may remove from the updated version history one or more modification events that occurred between the current modification event and the reverted modification event. Accordingly, users may be unable to access revisions to collaboration item 238 that were made between the current modification event and the reverted modification event.

Figure 7:
FIG. 7 illustrates an example view of a graphical user interface presenting a -reversion, according to example embodiments.

FIG. 7 illustrates an example view of a graphical user interface 700 presenting a version history, according to example embodiments. Graphical user interface 700 (hereinafter "GUI 700") may correspond to an updated graphical user interface of GUI 300 of FIG. 3 following reversion to a previous modification event. Accordingly, GUI 700 may correspond to GUI 204 and/or GUI 254 of FIG. 2A. In some embodiments, GUI 700 may be a web page presented in a web browser application of client device 150. In some embodiments, GUI 700 may be a graphical user interface generated by a native software application executing on client device 150.

As illustrated, GUI 700 may correspond to a graphical user interface generated as a result of a user prompting content management system (via GUI 300) to revert collaboration item 238 to a previous version. GUI 700 may include an updated version history 712 associated with collaboration item 238. Version history 712 may include one or more modification events 714 associated with collaboration item 238. GUI 700 may further include a graphical element 702 corresponding to a reversion modification event. As illustrated graphical element 702 may take the form of one or more arrows arranged in a circular shape. In some embodiments, each arrow may be a different color.

GUI 700 may further include a collaboration document area 715. Collaboration document area 715 may be similar to collaboration document area 315. Generally, collaboration document area 715 may include a representation of the revisions corresponding to a user's selection and metadata associated with the revision. As shown, collaboration document area 715 may include graphical element 704 and graphical element 706. Graphical element 704 may include a message to user of client device 150. Generally, the message displayed via graphical element 704 may notify the user that the selected notification event is a reversion. For example, the message may recite "You rolled back to a version from Apr. 10, 2018 at 6:15 pm. Any edits made between then and Apr. 11, 2018 at this minute were deleted." In some embodiments, graphical element 706 may be configured to include a message to user of client device 150. For example, rather than display one or more revisions associated with a reversion modification event, graphic element 706 may notify the user that a preview is unavailable for the reversion modification event. Accordingly, graphical element 706 may include an actionable link, which allows user to view a full document version of the reversion modification event. In some embodiments, graphical element 706 may be configured to display a preview of the version to which the user reverted. For example, graphical element 706 may display the version of the collaboration document from Apr. 10, 2018 at 6:15 pm, which is now the current version of the collaboration document.

GUI 700 may further include one or more graphical elements 708 and 328, (e.g., button, link, etc.) selectable by user. In some embodiments, graphical element 708 may be actionable upon a selection of a modification event. For example, graphical element 708 may be similar to graphical element 326, and may be actionable when a non-reversion modification event is selected. In those embodiments, however, in which a reversion modification event is selected, such as that illustrated in FIG. 7, graphical element 708 may be inactive (as illustrated by dashed lines). Accordingly, graphical element 708 may not be selected by the user, and thus, a user may not have the option to revert back to a reversion modification event.

Figure 8:
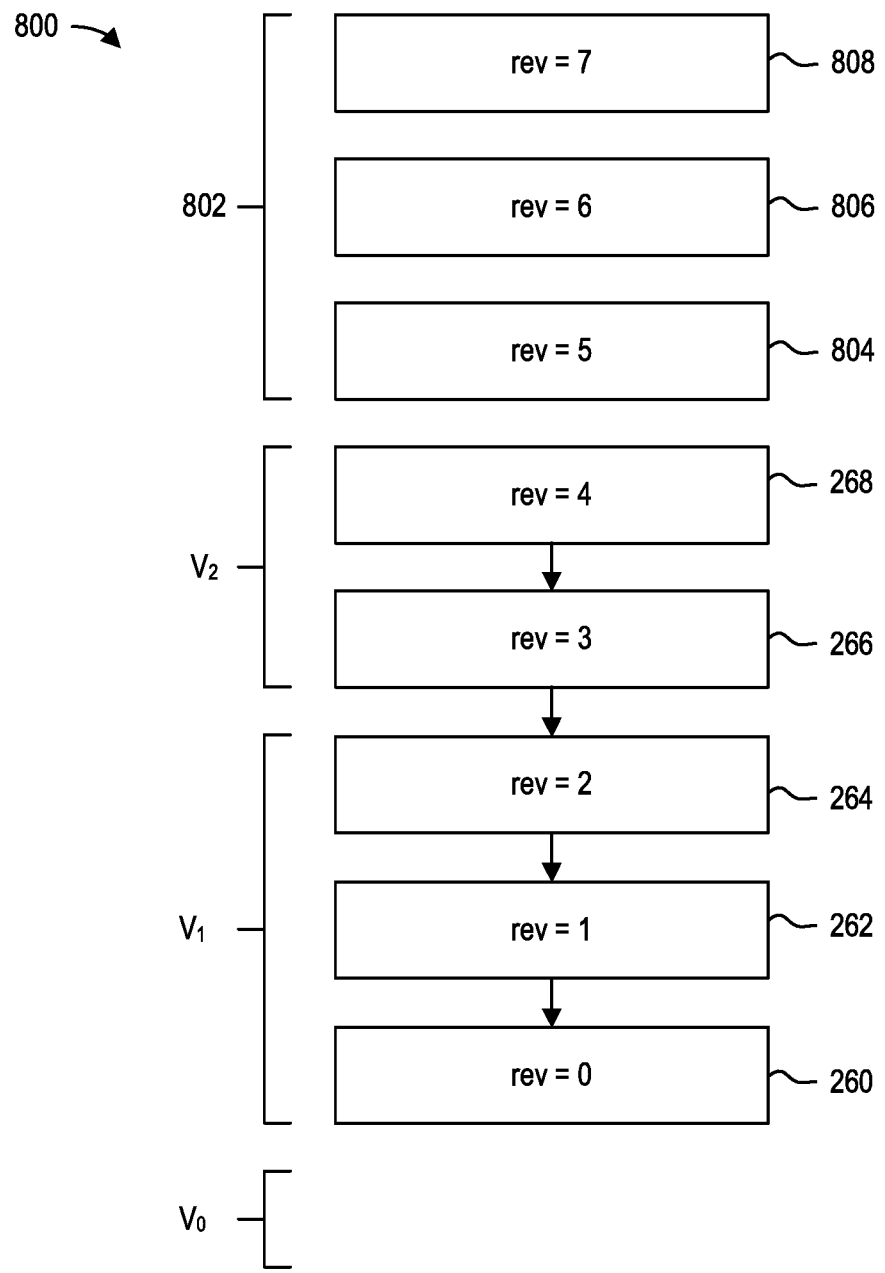
FIG. 8 is a block diagram illustrating one or more offline edits of a collaboration document, according to example embodiments.

FIG. 8 is a block diagram 800 of a collaboration document, according to example embodiments. Block diagram 800 may be similar to block diagram 280 discussed above in conjunction with FIG. 2B. As previously mentioned, in some embodiments, a user's client device (e.g., client device 202) may be offline (i.e., disconnected from server device 232). Versions of collaboration item 238 that may be created offline may be stored in a storage location 206 on client device 202.

As illustrated, block diagram 800 may include one or more versions of the collaboration document: the original version ($V_0$), Version 1 ($V_1$) and Version 2 ($V_2$). $V_1$ may include one or more revisions represented by blocks 260-264 and $V_2$ may include one or more revisions represented by blocks 266-268.

As illustrated, block diagram 800 may further include one or more offline versions as part of a version history of the collaboration document. Offline version 802 may include a first set of offline revisions (represented by blocks 804-808).

In operation, for example, a client device may render a current version of the document when the user accesses the document. For instance, in the example of FIG. 8, $V_1$ may be the current version of the collaboration document at the time the user accesses the document, and as such, the client device may render the original document ($V_0$) with $V_1$ layered thereon in response to the user accessing the document at that time. The user may begin editing the accessed document, and others may collaboratively edit the document in real time as well. As such, $V_2$ may include those one or more revisions (e.g., revisions 266-268) made by the user and possibly other users collaborating in the collaborative document. After $V_2$ is created, the client device may become disconnected from the network; however, the user of the client device may continue to work on the collaborative document while the user is offline. Those revisions made while the user is offline (represented by blocks 804-808) are offline revisions stored by the user's client device. Accordingly, those revisions may be stored as offline version 802. In some embodiments, the client device may note the time at which the revisions for offline version 802 are created. When the user of the client device subsequently accesses a version history while being connected to the network, the user will see the versions synchronized to the server as well as any of the user's offline versions previously stored on their device, where the offline versions are provided based on a time associated with the offline versions. For example, offline version 802 may be inserted between two sequential versions synchronized with the server based on the time associated with offline version 802 (e.g., between $V_2$ and the next version synchronized with the server).

Although offline version 802 may be a part of the collaboration document's version history for the user who created the offline revisions 804-808, offline version 802 may only be visible to that user who created offline version 802. For example, if Bob created offline version 802, offline version 802 may be available to Bob and unavailable to the remaining users that have read/write access to collaboration item 238. Accordingly, when a user requests a version history associated with collaboration item 238, content management service 116 may only include those offline versions that were created by the user requesting the version history.

Figure 9:
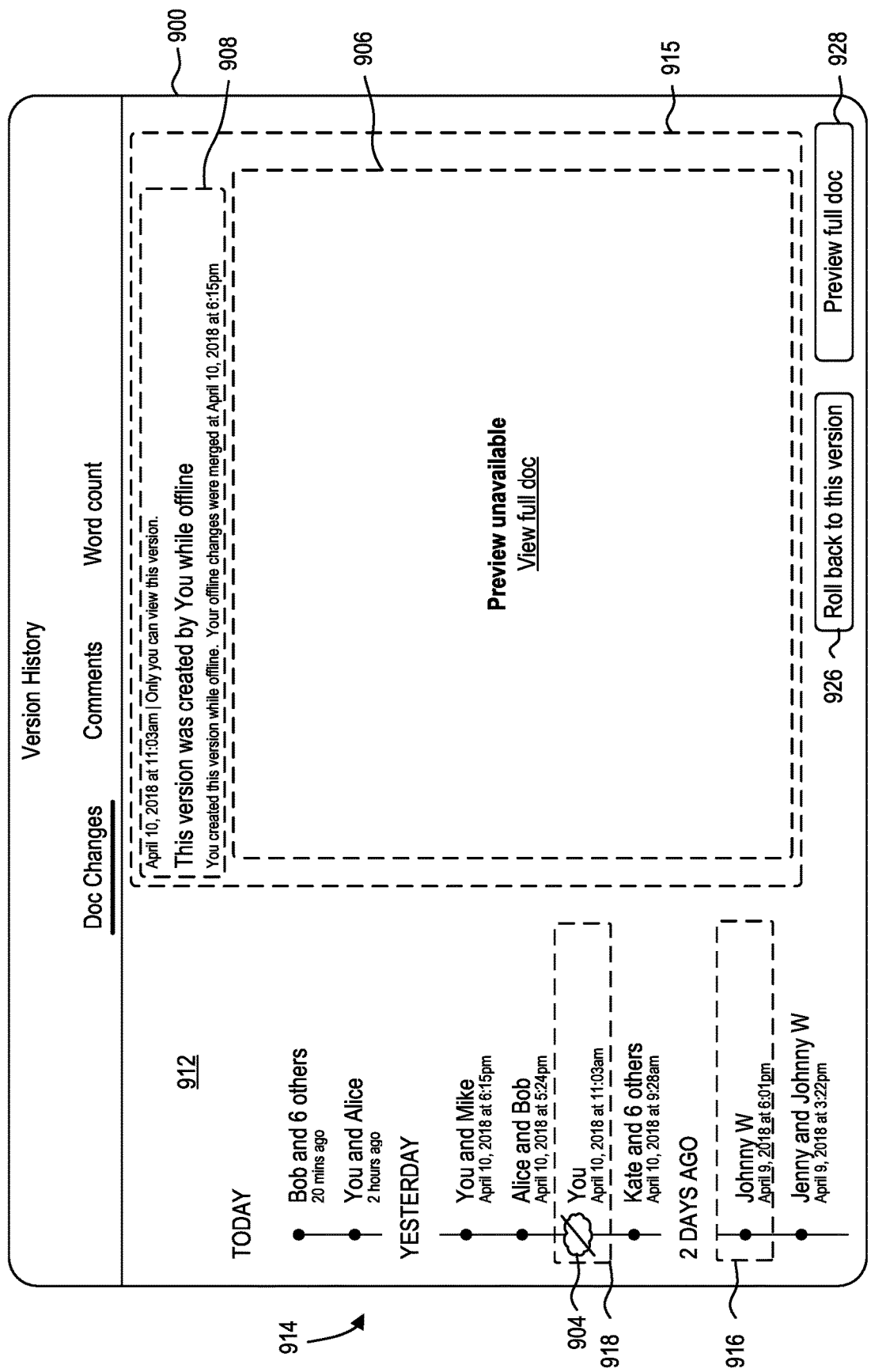
FIG. 9 illustrates an example view of a graphical user interface presenting an offline revision, according to example embodiments.

FIG. 9 illustrates an example view of a graphical user interface 900 presenting a version history, according to example embodiments. Graphical user interface 900 (hereinafter "GUI 900") may be similar to GUI 300 of FIG. 3. Accordingly, GUI 900 may correspond to GUI 204 and/or GUI 254 of FIG. 2A. In some embodiments, GUI 900 may be a web page presented in a web browser application of client device 150. In some embodiments, GUI 900 may be a graphical user interface generated by a native software application executing on client device 150.

As illustrated, GUI 900 may correspond to a graphical user interface generated as a result of a user requesting a version history from content management system 110. GUI 900 may include version history 912 associated with collaboration item 238. Version history 912 may include one or more modification events 914 associated with collaboration item 238. One or more modification events 914 may include one or more online modification events 916 and one or more offline modification events 918. As discussed in FIG. 8, one or more offline modification events 918 may only include those offline modification events 918 that were generated by the requesting user. GUI 900 may further include a graphical element 904 corresponding to an offline modification event. As illustrated graphical element 904 may take the form of a cloud with a line passing therethrough.

GUI 900 may further include a collaboration document area 915. Collaboration document area 915 may be similar to collaboration document area 315. Generally, collaboration document area 915 may include a representation of the revisions corresponding to a user's selection and metadata associated with the revision. As shown, collaboration document area 915 may include graphical element 906 and graphical element 908. Graphical element 908 may include a message to the user of client device 150. The message displayed via graphical element 908 may be based on the modification event selected from modification events 914. For example, when offline modification event 918 is selected, the message may recite "This version was created by You while offline." In some embodiments, graphical element 906 may be configured to include a message to user of client device 150 based on the modification event selected from the modification events 914. For example, when offline modification event 918 is selected, rather than display one or more revisions associated with an offline modification event, graphical element 906 may notify the user that a preview is unavailable for the offline modification event. Accordingly, graphical element 906 may include an actionable link, which allows the user to view a full document version associated with offline modification event 918. In some embodiments, graphical element 906 may be configured to include a preview of the version of the collaboration document associated with the offline modification events. For example, graphical element 906 may provide at least a partial preview of the collaboration document associated with the offline modification event 918.

GUI 900 may further include one or more graphical elements 926 and 928, (e.g., button, link, etc.) selectable by user. In some embodiments, graphical element 926 and graphical element 928 may be actionable upon a selection of a modification event (e.g., an offline modification event 918). In operation, when selected by user, GUI 900 (e.g., the browser or native application) may send a message to content management service requesting an action associated with each graphical element 926 and 928.

In the example shown in FIG. 9, when offline modification event 918 is selected, graphical element 926 may correspond to an instruction to roll back collaboration item 238 to the offline version of collaboration item 238 represented by the selected offline modification event 918. Accordingly, upon receiving input via graphical element 926, GUI 300 may request that content management service 116 roll back collaboration item 238 from a current version to a version represented by the selected offline modification event. Content management service 116 may, in turn, generate a new version of the collaboration document that replaces the current version of the collaboration document with the version of the collaboration document represented by the selected modification event.

Graphical element 928 may correspond to previewing the full version of the document corresponding to the selected modification event. Accordingly, when offline modification event 918 is selected, upon receiving input via graphical element 928, GUI 900 may request from content management service 116 a preview of the full version of the document corresponding to the selected offline modification event 918. Content management service 116 may deliver the preview of the full version of the document to GUI 900 so that GUI 900 may display the preview of the full version of the document on a display associated with client device 150.

Figure 10:
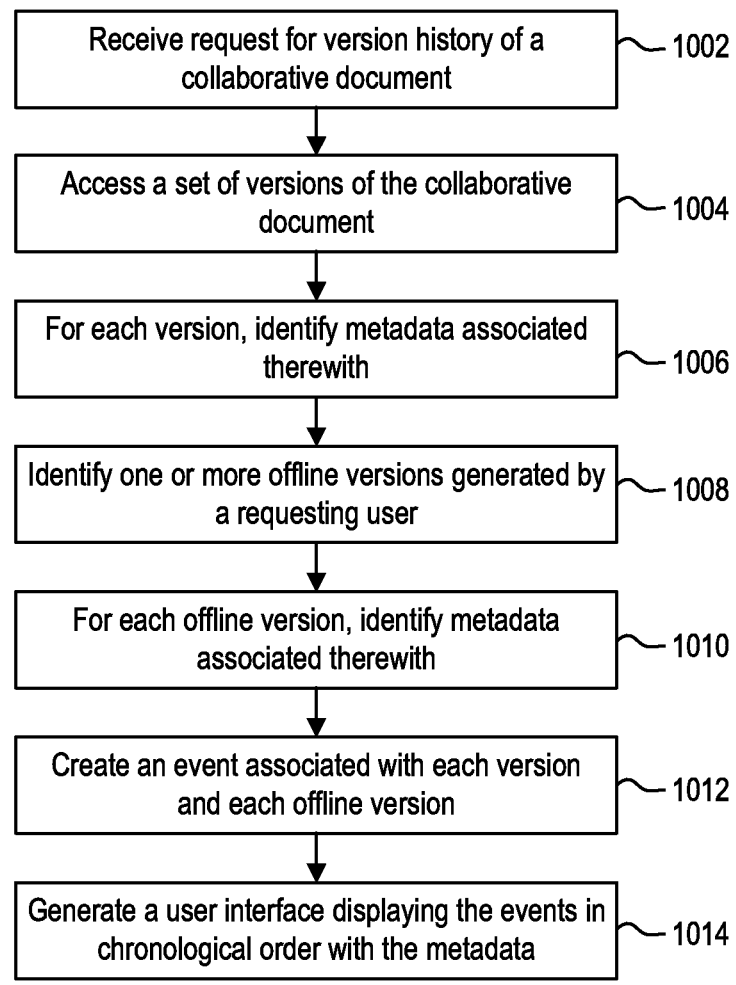
FIG. 10 illustrates a method of generating a graphical user interface presenting a version history, according to example embodiments.

FIG. 10 illustrates a method 1000 of generating a graphical user interface presenting a version history, according to example embodiments. At step 1002, content management system 110 may receive a request for a version history of a collaboration document (e.g., collaboration item 238). For example, a user may provide input to GUI 900 to cause GUI 900 to request from content management service 116 a version history of collaboration item 238.

At step 1004, content management system 110 may access a first set of versions associated with a collaboration document. The first set of versions associated with collaboration item 238 may correspond to one or more online revisions of collaboration item 238. For example, content management service 116 may access storage location 236 storing collaboration item 238. Stored with collaboration item 238 may be one or more online revisions associated with the collaboration document. Each online revision may correspond to an editing or modification of the collaboration document by an user that has read/write privileges to the collaboration document.

At step 1006, for each online revision, content management system 110 may identify metadata associated therewith. For example, content management service 116 may cross reference each one revision with metadata associated therewith to determine an user associated with each online revision. In some embodiments, content management service 116 may cross reference each online revision with metadata associated therewith to determine a date and time associated with each revision. Accordingly, content management service 116 may map one or more identified users and a date and time to each revision.

At step 1008, content management system 110 may access a second set of versions associated with a collaboration document. Second set of versions associated with collaboration item 238 may correspond to one or more offline revisions of collaboration item 238. For example, content management service 116 may access storage location 240 storing one or more offline versions of collaboration item 238. Each offline version may correspond to an editing or modification of collaboration item 238 by an user that requested the version history. In other words, when a user requests, from content management system 110, a version history of the collaboration document, content management system 110 may only identify those offline versions of the collaboration document that are attributed to the user.

At step 1010, for each offline version, content management system 110 may identify metadata associated therewith. For example, content management service 116 may cross reference each offline version with metadata associated therewith to a date and time associated with each revision. Accordingly, content management service 116 may map a date and time to each revision.

At step 1012, content management system 110 may generate an event associated with each online revision and each offline version. In some embodiments, each modification event may include one or more online revisions that are contemporaneous (or near-contemporaneous) in time. For example, content management service 116 may group a first revision made by Bob at 1:00 pm and a second revision made by Alice at 1:02 pm into a single modification event. Accordingly, each modification event may include more than one revision performed by more than one user at disparate times.

For each offline version, each offline modification event may correspond to one or more offline revisions that are attributed to the user that requested the version history of the collaboration document. In other words, a given user is only able to see those offline modification events attributed to that user, and is unable to see one or more offline modification events attributed to other users. For example, an offline modification event may include one or more revisions made by the requestor during a certain time frame. For example, content management service 116 may group a first revision made by the requestor (e.g., Bob) at 2:00 pm and a second revision made by the requestor (Bob) at 2:15 pm into a single offline modification event. Any offline revisions made by users that are not the requestor (i.e., not Bob) made between 2:00 pm and 2:15 pm, for example, may not be grouped into the offline modification event above.

At step 1014, content management system 110 may generate GUI 900 and transmit GUI 900 having version history 912 to client device 150 for rendering. For example, upon receiving the version history from content management service 152, client device 150 may generate GUI 900 that displays version history 912. In some embodiments, content management service 116 may transmit one or more rendering instructions to client device 150. For example, content management service 116 may denote which modification event is an online event and which modification event is an offline event. In some embodiments, instructions associated with an online event may instruct client device 150 to render a first graphical element dedicated to online events, and instructions associated with an offline event may instruct client device 150 to render a second graphical element dedicated to offline events. Accordingly, a user viewing version history on GUI 900 may decipher between an online modification event and an offline modification event.

Figure 11:
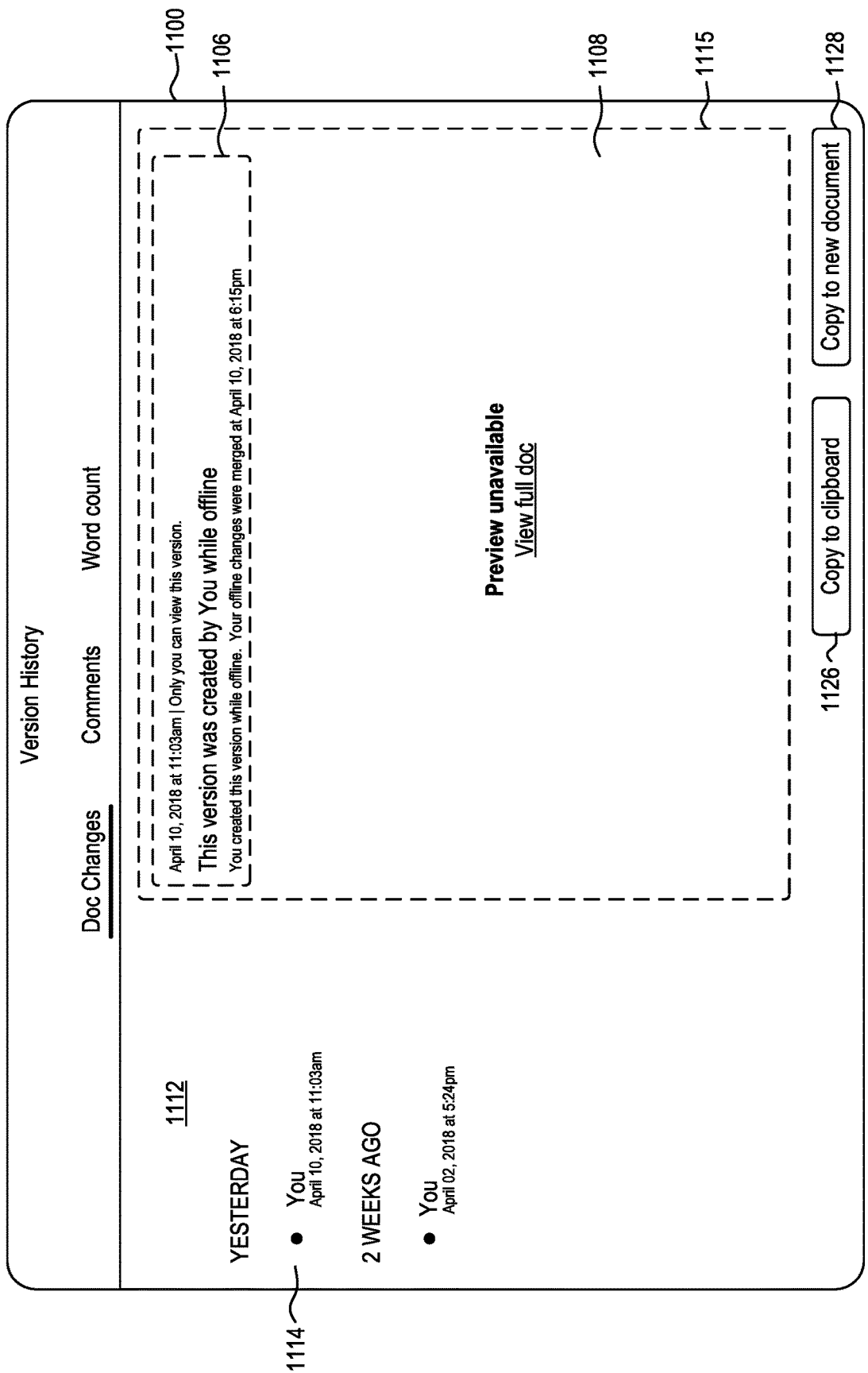
FIG. 11 illustrates an example view of a graphical user interface presenting a version history for a non-privileged requestor, according to example embodiments.

FIG. 11 illustrates an example view of a graphical user interface 1100 presenting a version history, according to example embodiments. Graphical user interface 1100 (hereinafter "GUI 1100") may be similar to GUI 900 of FIG. 9. Accordingly, GUI 1100 may correspond to GUI 204 and/or GUI 254 of FIG. 2A. In some embodiments, GUI 1100 may be a web page presented in a web browser application of client device 150. In some embodiments, GUI 1100 may be a graphical user interface generated by a native software application executing on client device 150.

As illustrated, GUI 1100 may correspond to a graphical user interface generated as a result of a user having only read-only access requesting a version history of collaboration item 238 from content management system 110. In some embodiments, the user may have previously had read/write access to collaboration item 238. GUI 1100 may include version history 1112 associated with collaboration item 238. Version history 1112 may include one or more offline modification events 1114 associated with collaboration item 238. Because user only has read-only access, user is not able to view online revisions made to collaboration item 238 or make edits to collaboration item 238. Rather, the user is only able to view those offline modification events attributed to the user.

GUI 1100 may further include a collaboration document area 1115. Collaboration document area 1115 may be similar to collaboration document 915. Generally, collaboration document area 1115 may include a representation of the revisions corresponding to a user's selection and metadata associated with the revision. As shown, collaboration document area 1115 may include graphical element 1106 and graphical element 1108. Graphical element 1106 may include a message to user of client device 150. Generally, the message displayed via graphical element 906 may notify the user that the selected notification event is an offline notification event. For example, the message may recite "This version was created by You while offline." In some embodiments, graphical element 1108 may be configured to include a message to user of client device 150. For example, rather than display one or more revisions associated with an offline modification event, graphical element 1108 may notify the user that a preview is unavailable for the offline modification event. Accordingly, graphical element 1108 may include an actionable link, which allows user to view a full document version of the reversion modification event. In some embodiments, graphical element 1108 may be configured to display a preview of the offline version. For example, graphical element 1108 may be configured to display a full preview of the offline version that includes the one or more offline revisions. In another example, graphical element 1108 may be configured to display a partial preview of the offline version that includes the one or more revisions GUI 1100 may further include one or more graphical elements 1126 and 1128, (e.g., button, link, etc.) selectable by user. In some embodiments, graphical element 1126 and graphical element 1128 may be actionable upon a selection of a modification event 1114. In other words, graphical element 1126 and graphical element 1128 may be inactive when a modification event 1114 is not selected. In operation, when selected by user, GUI 1100 (e.g., the browser or native application) may send a message to content management service requesting an action associated with each graphical element 1126 and 1128.

Graphical element 1126 may correspond to an instruction to copy to clipboard. Accordingly, upon receiving input via graphical element 1126, GUI 1100 may request that content management service 116 copy text in the offline version to a clipboard on client device 150.

Graphical element 1128 may correspond to copying to new document. Accordingly, upon receiving input via graphical element 1128, GUI 1100 may request that content management service 116 creates a new document with text from the selected modification event 1114. Content management service 116 may deliver the new document to GUI 1100 so that GUI 1100 may display the new document on display associated with client device 150.

Figure 12:
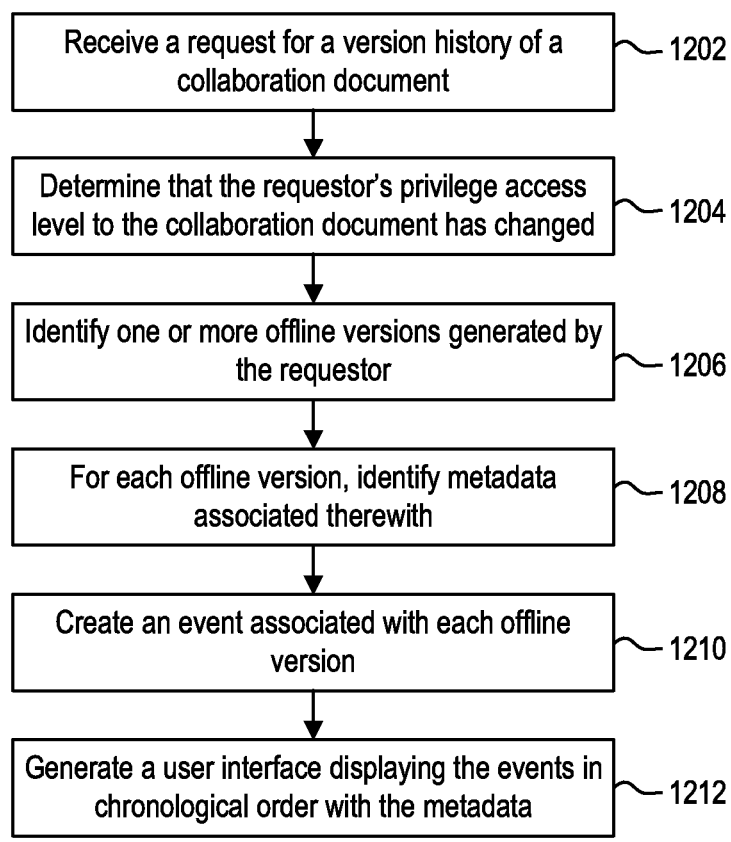
FIG. 12 illustrates a method of generating a graphical user interface for a non-privileged requestor, according to example embodiments.

FIG. 12 illustrates a method 1200 of generating a graphical user interface presenting a version history, according to example embodiments. At step 1202, content management system 110 may receive a request for a version history of a collaboration document (e.g., collaboration item 238). For example, a user may provide input to GUI 1100 to cause GUI 1100 to request from content management service 116 a version history of collaboration item 238.

At step 1204, content management system 110 may determine that requestor's access privilege level with respect to collaboration item 238 was changed. For example, content management system 110 may access one or more rules associated with collaboration item 238. The one or more rules may define user access privileges to collaboration item 238. In some embodiments, one or more users may have read/write access, read only access, or no access to collaboration item 238. When a user's privilege level changes, for example, from read/write access to read only access, a user may lose the ability to view one or more online revisions made to collaboration item 238. However, the user may retain the ability to view one or more offline revisions made to collaboration item 238 by the user.

At step 1206, content management system 110 may access one or more offline versions of collaboration item 238 attributed to the requestor. For example, content management service 116 may access storage location 240 storing one or more offline versions of collaboration item 238. Each offline version may correspond to an offline editing or modification of collaboration item 238 by a user.

At step 1208, for each offline version, content management system 110 may identify metadata associated therewith. For example, content management service 116 may cross reference each offline version with metadata associated therewith to a date and time associated with each revision. Accordingly, content management service 116 may map a date and time to each revision.

At step 1210, content management system 110 may generate an event associated with each offline version. For example, content management service 116 may group one or more offline revisions to define a modification event. For each offline version, in some embodiments, the modification event may include one or more revisions made by the requestor during a certain time frame. For example, content management service 116 may group a first revision made by Bob at 2:00 pm and a second revision made by Bob at 2:15 pm into a single modification event.

At step 1212, content management system 110 may generate GUI 1100 and transmit GUI 1100 having version history 1112 to client device 150 for rendering. For example, upon receiving the version history from content management service 152, client device 150 may generate GUI 1100 that displays version history 1112.

Figure 13:
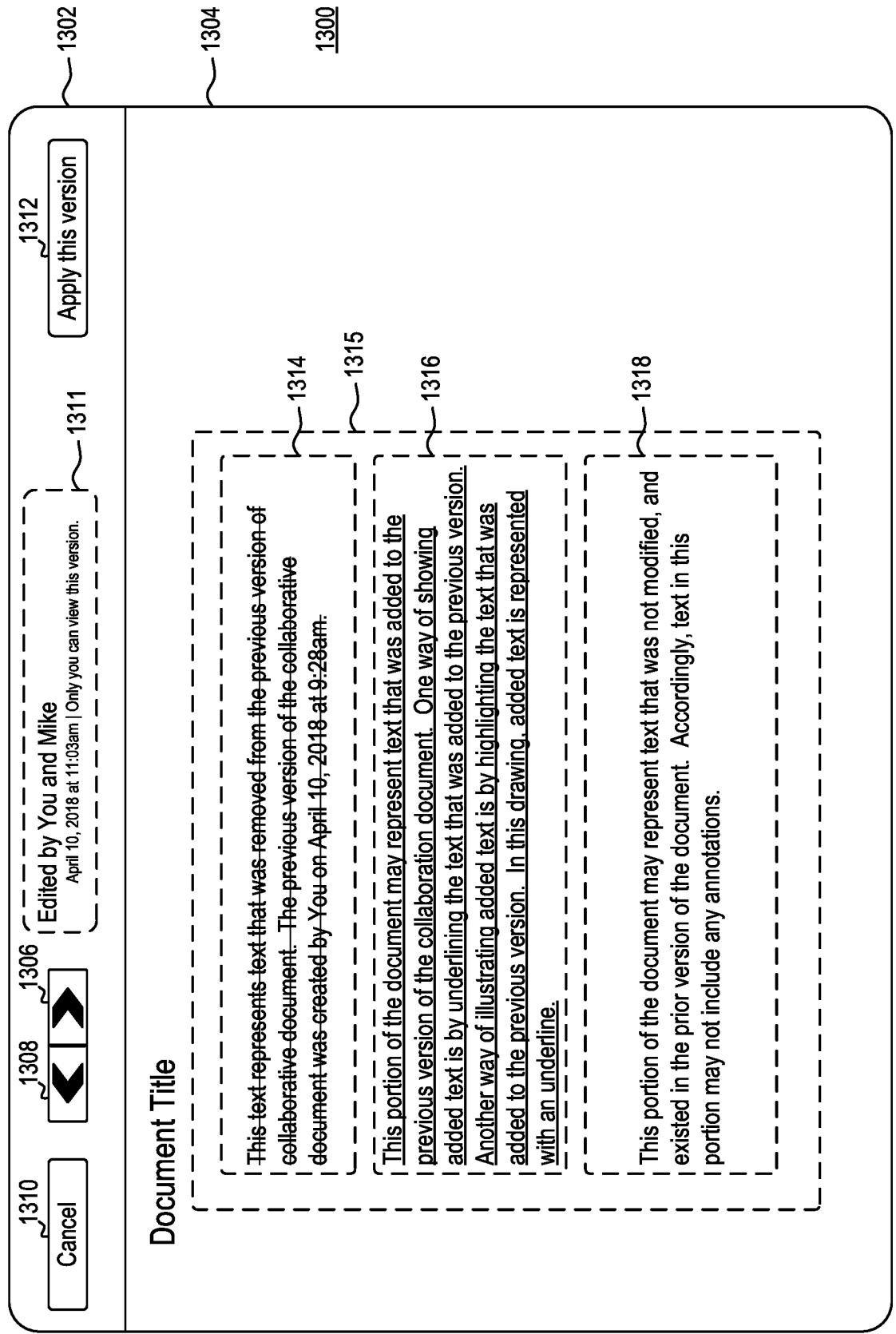
FIG. 13 illustrates an example view of a graphical user interface presenting a version of a collaboration document, according to example embodiments.

FIG. 13 illustrates an example view of a graphical user interface 1300 presenting a version of a collaboration document, according to example embodiments. Graphical user interface 1300 (hereinafter "GUI 1300") may correspond to GUI 204 and/or GUI 254 of FIG. 2A. In some embodiments, GUI 1300 may be a web page presented in a web browser application of client device 150. In some embodiments, GUI 1300 may be a graphical user interface generated by a native software application executing on client device 150.

As illustrated, GUI 1300 may correspond to a graphical user interface generated as a result of a user requesting a version history of collaboration item 238 from content management system 110. Rather than generate a version history side panel, such as that illustrated in FIGS. 3, 7, 9, and 11, GUI 1300 may generate dedicated pages to each respective version of collaboration item 238.

GUI 1300 may include a first portion 1302 and a second portion 1304. First portion 1302 may include one or more graphical elements 1306, 1308, 1310, 1311, and 1312 (e.g., button, link, etc.) selectable by user to cause GUI 1300 (e.g., the browser or native application) to send a message to content management service requesting information associated with each graphical element 1306, 1308, 1310, 1311, and 1312.

Graphical element 1306 and graphical element 1308 may correspond to toggle commands between one or more versions of collaboration item 238. Accordingly, upon receiving input via graphical element 1306, GUI 1300 may request from content management service 116 one or more document changes (e.g., edits, modifications, etc.) associated with a previous version of collaboration item 238 (as compared to the displayed version). Additionally, upon receiving input via graphical element 1308, GUI 1300 may request from content management service 116 one or more document changes associated with a subsequent version of collaboration item 238 (as compared to the displayed version). Content management service 116 may deliver the one or more document changes to GUI 1300 so that GUI may display the one or more document changes associated with the requested version on the display associated with client device 150.

Graphical element 1310 may correspond to a cancel command. Accordingly, upon receiving input via graphical element 1310, GUI 1300 may request that content management service 116 update GUI 1300 to no longer provide a version history associated with collaboration item 238. Content management service 116 may deliver a new web page, such as that providing a live version of the current version of collaboration item 238, so that GUI 1300 may no longer display the version history.

Graphical element 1312 may correspond to an apply this version command. Accordingly, upon receiving input via graphical element 1310, GUI 1300 may request that content management service revert collaboration item 238 to a version of the collaboration document currently depicted on GUI 1300. Accordingly, upon receiving input via graphical element 1316, GUI 1300 may request that content management service 116 reverts the collaboration document from a current version to a version represented by illustrated version. Content management service 116 may, in turn, generate a new revision to the collaboration document that replaces the current version of the collaboration document with the version of the collaboration document represented by the selected modification event.

Graphical element 1311 may correspond to metadata associated with a current version of collaboration item 238 displayed via GUI 1300. For example, as illustrated, graphical element 1311 may recite "Edited by You and Mike."

Second portion 1304 may include a collaboration document area 1315. Generally, collaboration document area 1315 may include a representation of the revisions corresponding to a particular version of the collaboration item 238. As shown, collaboration document area 1315 may include section 1314, section 1316, and section 1318. Section 1314 may correspond to text that was removed from the previous version of the collaboration document. In some embodiments, GUI 1300 may illustrate removed text by striking through that text, which was removed. In some embodiments, GUI 1300 may illustrate removed text by highlighting that text which was removed, using a certain color highlight (e.g., red). In some embodiments, GUI 1300 may illustrate the removed text by displaying the removed text in a certain color (e.g., orange). Section 1316 may correspond to text that was added to the previous version of the collaboration document. In some embodiments, GUI 1300 may illustrate added text by underling that text which was added. In some embodiments, GUI 1300 may illustrate added text by highlighting that text which was added using a certain color highlight (e.g., green). In some embodiments, GUI 1300 may illustrate added text by displaying the added text in a certain color (e.g., blue). Section 1318 may correspond to text that was not removed or added from the previous version of collaboration item 238.

Figure 14:
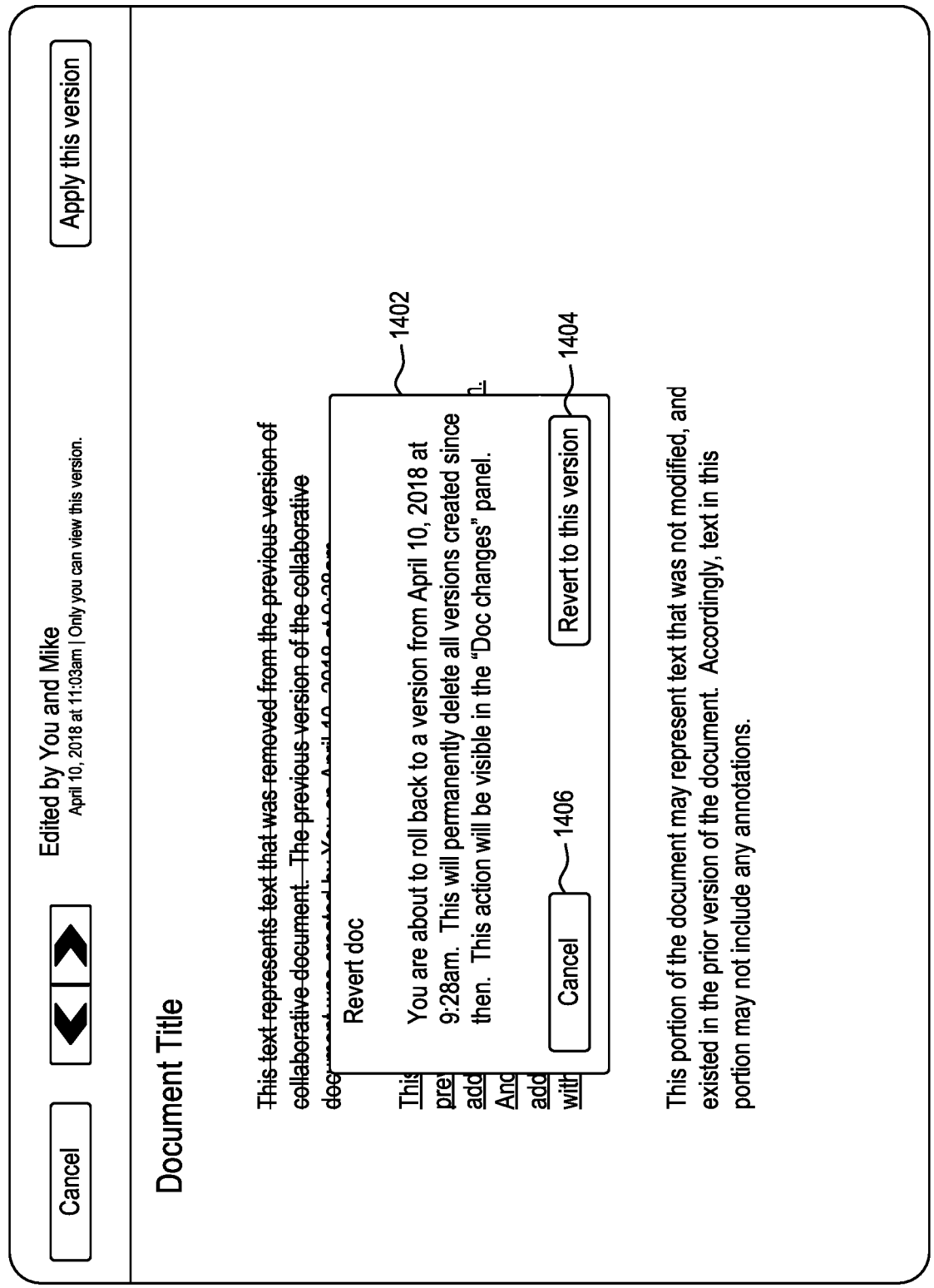
FIG. 14 illustrates an example view of a graphical user interface presenting a version of a collaboration document, according to example embodiments.

FIG. 14 illustrates an example view of a graphical user interface 1400 presenting a version of a collaboration document, according to example embodiments. Graphical user interface 1400 (hereinafter "GUI 1400") may correspond to an updated graphical user interface of GUI 1300 of FIG. 13 following user input via graphical element 1312, prompting content management service 116 to apply the currently viewed version of collaboration item 238. Accordingly, GUI 1400 may correspond to GUI 204 and/or GUI 254 of FIG. 2A. In some embodiments, GUI 1400 may be a web page presented in a web browser application of client device 150. In some embodiments, GUI 1400 may be a graphical user interface generated by a native software application executing on client device 150.

As shown, upon selection of graphical element 1312, content management service 116 may deliver updated GUI 1400 that include overlay layer 1402. Overlay layer 1402 may include language that prompts a user to confirm that the user wishes to revert to the selected version of collaboration item 238. For example, overlay layer 1402 may include message 1403 that recites: "You are about to roll back to a version from Apr. 10, 2018 at 9:28 am. This will permanently delete all versions created since then. This action will be visible in the "Doc changes" panel."

Overlay layer 1402 may further include graphical element 1404 and graphical element 1406 (e.g., button, link, etc.) selectable by user to cause GUI 1400 (e.g., the browser or native application) to send a message to content management service requesting one or more actions associated with each graphical element 1404 and 1406.

Graphical element 1404 may correspond to revert to this version. Accordingly, upon receiving input via graphical element 1404, GUI 1400 may request that content management service revert collaboration item 238 to a version of the collaboration document currently depicted on GUI 1400. Accordingly, upon receiving input via graphical element 1416, GUI 1400 may request that content management service 116 reverts the collaboration document from a current version to a version represented by illustrated version. Content management service 116 may, in turn, generate a new revision to the collaboration document that replaces the current version of the collaboration document with the version of the collaboration document represented by the selected modification event.

Graphical element 1406 may correspond to a cancel command. Accordingly, upon receiving input via graphical element 1406, GUI 1400 may cancel the request that content management service 116 reverts to the displayed version of collaboration item 238.

FIG. 15A illustrates a system bus computing system architecture 1500, according to example embodiments. One or more components of system 1500 may be in electrical communication with each other using a bus 1505. System 1500 may include a processing unit (CPU or processor) 1510 and a system bus 1505 that couples various system components including the system memory 1515, such as read only memory (ROM) 1520 and random access memory (RAM) 1525, to processor 1510. System 1500 can include a cache of high-speed memory connected directly with, in close proximity to, or integrated as part of processor 1510. System 1500 can copy data from memory 1515 and/or storage device 1530 to cache 1512 for quick access by processor 1510. In this way, cache 1512 may provide a performance boost that avoids processor 1510 delays while waiting for data. These and other modules can control or be configured to control processor 1510 to perform various actions. Other system memory 1515 may be available for use as well. Memory 1515 may include multiple different types of memory with different performance characteristics. Processor 1510 can include any general purpose processor and a hardware module or software module, such as service 1 1532, service 2 1534, and service 3 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction with the computing device 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with computing device 1500. Communications interface 1540 can generally govern and manage the user input and system output. There is no restriction on operating on any particular hardware arrangement and therefore the basic features here may easily be substituted for improved hardware or firmware arrangements as they are developed.

Storage device 1530 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

Storage device 1530 can include services 1532, 1534, and 1536 for controlling the processor 1510. Other hardware or software modules are contemplated. Storage device 1530 can be connected to system bus 1505. In one aspect, a hardware module that performs a particular function can include the software component stored in a computer-readable medium in connection with the necessary hardware components, such as processor 1510, bus 1505, display 1535, and so forth, to carry out the function.

FIG. 15B illustrates a computer system 1550 having a chipset architecture that can be used in executing the described method and generating and displaying a graphical user interface (GUI). Computer system 1550 may be an example of computer hardware, software, and firmware that can be used to implement the disclosed technology. System 1550 can include a processor 1555, representative of any number of physically and/or logically distinct resources capable of executing software, firmware, and hardware configured to perform identified computations. Processor 1555 can communicate with a chipset 1560 that can control input to and output from processor 1555. In this example, chipset 1560 outputs information to output 1565, such as a display, and can read and write information to storage device 1570, which can include magnetic media, and solid state media, for example. Chipset 1560 can also read data from and write data to RAM 1575. A bridge 1580 for interfacing with a variety of user interface components 1585 can be provided for interfacing with chipset 1560. Such user interface components 1585 can include a keyboard, a microphone, touch detection and processing circuitry, a pointing device, such as a mouse, and so on. In general, inputs to system 1550 can come from any of a variety of sources, machine generated and/or human generated.

Chipset 1560 can also interface with one or more communication interfaces 1590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1555 analyzing data stored in storage 1570 or 1575. Further, the machine can receive inputs from a user through user interface components 1585 and execute appropriate functions, such as browsing functions by interpreting these inputs using processor 1555.

It can be appreciated that example systems 1500 and 1550 can have more than one processor 1510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A computer-implemented method, comprising:
receiving a request for versions of a collaborative document managed by a collaborative content management system from a client device having access to an account associated with the collaborative content management system;
accessing, by the collaborative content management system, a set of versions comprising an online version and an offline version, of the collaborative document stored at a storage location of the collaborative content management system, the offline version created on the client device having access to the account associated with the collaborative content management system while the client device was disconnected from the collaborative content management system and uploaded to the collaborative content management system and stored at the storage location of the collaborative content management system when the client device is connected to the collaborative content management system, the online version created while the client device is connected to the collaborative content management system and stored at the storage location of the collaborative content management system; and
generating, by the collaborative content management system, a user interface providing the set of versions comprising the online version and the offline version, wherein the offline version is only displayed to a user of the account.

2. The computer-implemented method of claim 1, wherein generating, by the collaborative content management system, the user interface providing the set of versions, comprises:
generating a side panel comprising the set of versions of the collaborative document.

3. The computer-implemented method of claim 2, further comprising:
receiving, via the user interface, a selection of a version in the set of versions; and
generating a second panel adjacent the side panel, the second panel comprising the selected version of the collaborative document.

4. The computer-implemented method of claim 1, wherein generating by the collaborative content management system, the user interface, comprises:
generating a first graphical element associated with the online version, the first graphical element denoting that the online version was generated while the client device was in communication with the collaborative content management system; and
generating a second graphical element associated with the offline version, the second graphical element denoting that the offline version was generated while the client device was not in communication with the collaborative content management system.

5. The computer-implemented method of claim 1, further comprising:
receiving, by the collaborative content management system from the user interface, a request to view the online version in the set of versions; and
delivering, by the collaborative content management system, to the client device one or more revisions associated with the online version.

6. The computer-implemented method of claim 5, further comprising:
receiving, by the collaborative content management system via the user interface, a request to revert a current version of the collaborative document to the online version;
modifying, by the collaborative content management system, the current version of the collaborative document to reflect a state of the collaborative document represented by the online version; and
updating, by the collaborative content management system, the user interface to reflect a reversion from the current version to the online version.

7. The computer-implemented method of claim 1, further comprising:
receiving, by the collaborative content management system from the user interface, a request to view the offline version in the set of versions; and
delivering, by the collaborative content management system, a preview image of the offline version.

8. The computer-implemented method of claim 7, comprising:
receiving, by the collaborative content management system via the user interface, a request to roll back a current version of the collaborative document to the offline version represented by the preview image;
replacing, by the collaborative content management system, the current version of the collaborative document with content in the offline version represented by the preview image; and
updating, by the collaborative content management system, the user interface to indicate that the current version of the collaborative document was replaced.

9. The computer-implemented method of claim 1, wherein generating, by the collaborative content management system, the user interface providing the set of versions, comprises:
associating, with each version in the set of versions, at least one or more of a date associated with each version and one or more authors associated with each version.

10. The computer-implemented method of claim 1, wherein generating, by the collaborative content management system, the user interface, comprises:
identifying a plurality of offline versions in the set of versions, the plurality of offline versions comprising the offline version;
for each offline version, determining whether the offline version was created by the account associated with the client device;
identifying a subset of offline versions generated by the account associated with the client device, the subset of offline versions comprising the offline version; and
including the subset of offline versions in the set of versions.

11. The computer-implemented method of claim 1, further comprising:
receiving a second request for versions of the collaborative document managed by the collaborative content management system from a second client device having access to a second account associated with the collaborative content management system;
accessing, by the collaborative content management system, the set of versions, comprising the online version and a second offline version, of the collaborative document, the second offline version created on the second client device having access to the second account associated with the collaborative content management system while the second client device was disconnected from the collaborative content management system and uploaded to the collaborative content management system and stored at the storage location of the collaborative content management system when the second client device is connected to the collaborative content management system, the online version created while the client device is connected to the collaborative content management system and stored at the storage location of the collaborative content management system; and generating, by the collaborative content management system, a second user interface providing the set of versions comprising the online version and the second offline version, wherein the second offline version is only displayed to a second user associated with the second account.

12. The computer-implemented method of claim 1, wherein the offline version comprises edits that are not merged with a prior online version of the collaborative document when synchronized.

13. The computer-implemented method of claim 1, wherein the online version comprises edits that are merged with a prior online version of the collaborative document when synchronized.

14. A non-transitory computer readable medium comprising one or more sequences of instructions, which, when executed by one or more processors, cause the one or more processors to perform operations, comprising:

receiving a request for versions of a collaborative document managed by a collaborative content management system from a client device having access to an account associated with the collaborative content management system;

accessing a set of versions, comprising an online version and an offline version, of the collaborative document stored at a storage location of the collaborative content management system, the offline version created on the client device having access to the account associated with the collaborative content management system while the client device was disconnected from the collaborative content management system and uploaded to the collaborative content management system and stored at the storage location of the collaborative content management system when the client device is connected to the collaborative content management system, the online version created while the client device is connected to the collaborative content management system and stored at the storage location of the collaborative content management system; and generating a user interface providing the set of versions comprising the online version and the offline version, wherein the offline version is only displayed to a user of the account.

15. The non-transitory computer readable medium of claim 14, wherein generating the user interface, comprises:

generating a first graphical element associated with the online version, the first graphical element denoting that the online version was generated while the client device was in communication with the collaborative content management system; and generating a second graphical element associated with the offline version, the second graphical element denoting that the offline version was generated while the client device was not in communication with the collaborative content management system.

16. The non-transitory computer readable medium of claim 14, further comprising:

receiving a request to view the online version in the set of versions; and delivering to the client device one or more revisions associated with the online version.

17. The non-transitory computer readable medium of claim 16, further comprising:

receiving, via the user interface, a request to revert a current version of the collaborative document to the online version;

modifying the current version of the collaborative document to reflect a state of the collaborative document represented by the online version; and updating the user interface to reflect a reversion from the current version to the online version.

18. A computer-implemented method, comprising:

receiving, by a computing device via a user interface displayed thereon, input requesting a version history associated with a collaborative document;

transmitting, by the computing device to a collaborative content management system, a request for versions of the collaborative document managed by the collaborative content management system, wherein the computing device has access to an account associated with the collaborative content management system;

receiving, by the computing device from the collaborative content management system, a set of versions, comprising an online version and an offline version, of the collaborative document stored at a storage location of the collaborative content management system, the offline version created on the computing device having access to the account associated with the collaborative content management system while the computing device was disconnected from the collaborative content management system and uploaded to the collaborative content management system and stored at the storage location of the collaborative content management system when the computing device is connected to the collaborative content management system, the online version created while the computing device is connected to the collaborative content management system and stored at the storage location of the collaborative content management system; and displaying, by a display associated with the computing device, the set of versions comprising the online version and the offline version, wherein the offline version is only displayed to a user of the account.

19. The computer-implemented method of claim 18, further comprising:

transmitting, by the computing device to the collaborative content management system, a request for a version of the collaborative document from the set of versions;

receiving, by the computing device from the collaborative content management system, the requested version of the collaborative document; and displaying, by the computing device, the requested version by the display associated with the computing device.

20. The computer-implemented method of claim 19, further comprising:

receiving, by the computing device, input corresponding to one or more revisions made to the version of the collaborative document that is displayed;

synchronizing, by the computing device, the one or more revisions made to the version of the collaborative document with the collaborative content management system;

determining, by the computing device, that, during the synchronizing, the computing device was disconnected from the collaborative content management system; and storing, by the computing device, the one or more revisions as a new offline version of the collaborative document.

21. The computer-implemented method of claim 20, further comprising:

determining, by the computing device, that the computing device is re-connected with the collaborative content management system; and continuing, by the computing device, to synchronize the one or more revisions with the collaborative content management system.

22. The computer-implemented method of claim 18, wherein the offline version is synchronized to the collaborative content management system when the computing device is connected to the collaborative content management system.

* * * * *